(12) United States Patent
Santorius et al.

(10) Patent No.: US 6,283,687 B1
(45) Date of Patent: Sep. 4, 2001

(54) MULTIPLE MILLING ON CRANKSHAFTS

(75) Inventors: Rolf Santorius, Uhingen-Nassachmühle; Paul Dieter Scharpf, Schlat; Wolf-Dietrich Voss, Boll; Matthias Kohlhase, Schramberg-Sulgen; Herbert Kiefer, Steisslingen; Leo Schreiber, Schwäbisch-Gmünd, all of (DE)

(73) Assignee: Boehringer Werkzeugmaschinen GmbH (DE)

( * ) Notice: Subject to any disclaimer, the term of this patent is extended or adjusted under 35 U.S.C. 154(b) by 0 days.

(21) Appl. No.: 09/202,865

(22) PCT Filed: Jul. 1, 1997

(86) PCT No.: PCT/EP97/03417

§ 371 Date: Aug. 2, 1999

§ 102(e) Date: Aug. 2, 1999

(87) PCT Pub. No.: WO98/00260

PCT Pub. Date: Jan. 8, 1998

(30) Foreign Application Priority Data

Jul. 2, 1996 (DE) .............................................. 196 26 609

(51) Int. Cl.[7] ................ B23B 5/18; B23C 3/06
(52) U.S. Cl. .................... 409/132; 409/199; 409/200; 29/6.01; 82/106
(58) Field of Search ..................... 409/132, 131, 409/199, 200; 29/6.01; 82/106; 148/226; 451/399

(56) References Cited

U.S. PATENT DOCUMENTS

| | | | |
|---|---|---|---|
| 1,100,842 | * 6/1914 | OVergaard | 409/132 |
| 2,215,007 | * 9/1940 | Kraus | 409/132 |
| 2,942,526 | * 6/1960 | Maecker | 29/6.01 |
| 4,326,323 | * 4/1982 | Kralowetz et al. | 409/199 |
| 4,384,333 | * 5/1983 | Maecker | 82/106 |
| 4,656,723 | * 4/1987 | Uchida | 148/226 |
| 5,511,913 | * 4/1996 | Naumann | 409/131 |
| 5,765,270 | * 6/1998 | Schrod et al. | 29/6.01 |
| 5,839,862 | * 11/1998 | Hayashi et al. | 409/199 |
| 6,038,489 | * 3/2000 | Pickles et al. | 82/106 |
| 6,050,757 | * 4/2000 | Gesell | 409/132 |

FOREIGN PATENT DOCUMENTS

| | | | |
|---|---|---|---|
| 19546197 | * 1/1997 | (DE) . | |
| 2303091 | * 2/1997 | (GB) . | |
| 63-102817 | * 5/1988 | (JP) | 409/132 |
| WO 97/21513 | * 6/1997 | (WO) . | |

* cited by examiner

Primary Examiner—A. L. Wellington
Assistant Examiner—Erica E. Cadugan
(74) Attorney, Agent, or Firm—Norris, McLaughlin & Marcus, P.A.

(57) ABSTRACT

The invention relates to a process and a device for machining of workpieces (10) like crankshafts or similar components which are rotated about their own axis during machining, at least two mutually independently operating rotary milling tools (15, 16, 21, 22) performing material-removing operations simultaneously at different points on a workpiece. In order to maximize the edge life of the tools used, with special regard to the most uniform wear possible on all the rotary milling tools, it is proposed that the rotation speed of the tools be matched or varied to provide an optimum cutting operation and the rotation speed of the second and any other rotary milling tool be controlled dependently upon the tool rotation speed predetermined by the matching or variation.

16 Claims, 19 Drawing Sheets

VIEW R ( ON $P_r$ )

SECTION F - F $\chi_r + \varepsilon_r + \chi_r' = 180°$

SECTION P - P

MULTIPLE MILLING ON CRANKSHAFTS

BACKGROUND OF THE INVENTION

The invention relates to a process for the metal-removing machining of the end faces and also circumferential faces, which may be arranged both centrically and eccentrically, on crankshafts or similar workpieces.

Owing to the eccentrically positioned, for example peripheral, surfaces to be machined of the crankpin journals or end faces of the webs and the instability of the crankshaft, caused by its shape, as a workpiece, straight crankshafts always place high demands on the machining processes.

Crankshafts are usually rough-machined by metal-removing machining using specific cutting edges, that is to say by turning, milling, turn broaching, etc., and then the precision-machining to a dimension is carried out by means of grinding, hardening of the workpiece surfaces having hitherto generally been carried out subsequent to the metal-removing rough-machining and prior to the grinding.

Although in theory metal-removing machining processes are available which can be used to machine both the centric centre bearings and also the eccentric big-end journals and the ends of the web surfaces, for reasons of economy machining is generally performed using different processes:

Thus, in recent times rotary turn broaching has become established for machining the centre bearings, in which process work is carried out on the rapidly rotating workpiece, which is chucked on the centre-bearing axis, using an internal broaching tool which has been bent into a curved contour, generally a circular contour or a circular-segment contour.

The eccentric end faces of the webs are generally also machined at the same time.

By contrast, for machining the eccentric crankpin journals, that is to say the peripheral surfaces thereof, internal milling, that is to say milling with an annular milling cutter which has inwardly directed cutting edges on its inner circumference, has become the established procedure. In this process, the crankshaft generally does not rotate during the machining, but rather the internal-milling cutter rotates and additionally moves on a circular path around the crankpin journal situated in the free interior of the internal-milling cutter. The cutting speed is in this case achieved exclusively by the movement of the internal-milling cutter. One of the drawbacks of this process is that particularly in the machining of journals, owing to the identical directions of curvature of journal and milling cutter, the result is a considerable wrap, that is to say that frequently a plurality of cutting edges are in action at the same time. This results in the introduction of high transverse forces into the workpiece. Due to the crankshaft being stationary, it is possible simultaneously to machine a plurality of crankpin journals by means of respectively separate internal-milling units, as long as the corresponding crankpin journals are also spaced sufficiently far apart in the axial direction to allow different internal-milling units to act on them.

The processes described have become established in the mass production of crankshafts, for example for engines for passenger cars, due to the fact that they exhibit sufficient machining accuracy while also permitting very much lower machining times per crankshaft or per journal than, for example, turning.

Although the maintenance, repair, refitting and adjustment of throw-away cutting-tool tips, etc. is more difficult in the case of such an internally toothed milling cutter, such a tool in principle offers the advantage of good and stable mounting in a tool support which surrounds the annular tool on all sides. This is necessary since, owing to the crankshaft being stationary, the support has to be able to move the annular tool during internal milling in a defined manner not only in the X-direction but also in the Y-direction. However, the rotational speed of the internal-milling cutter generally remains constant during a revolution around the bearing journal to be machined and is independent of the current relative position of workpiece and tool with respect to one another.

It is sufficient for the support which rotates the internal-milling cutter to be displaceable exclusively in the X-direction but not also in the Y-direction only if, on the one hand, the workpiece is driven in rotation in a defined manner during the machining (C-axis of the workpiece) and, on the other hand, the free internal diameter of the internal-milling cutter is greater than the throw of the largest crankshaft to be machined.

Particularly in the case of machines in which a plurality of tool supports are present, in order to work with a plurality of tools, that is to say, for example, internal-milling cutters, simultaneously on the same workpiece, all things considered it represents a simplification and saving if it is possible for each of the plurality of supports to do without the Y-axis, even though it is then additionally necessary for the C-axis to be present for the rotation which is then necessary at the spindle heads for the crankshaft, which as a rule is chucked and driven on both sides.

In this case, when simultaneously machining a plurality of crankpin journals, the crankshaft rotates at a constant speed and the various internal-milling cutters also rotate at the same speed, which remains constant during a journal-machining operation.

A milling tool of this kind is [lacuna] with a multiplicity of cutting edges, which are generally arranged as throw-away cutting-tool tips on an annular body (in the case of an internal-milling cutter) or a disc-like body (in the case of an external-milling cutter), in the internal circumferential region or in the external circumferential region. The reconditioning or refitting or resetting of such milling cutters firstly takes considerable time and, owing to the not inconsiderable costs of the cutting means used, is expensive.

The machining costs per crankshaft, which are to be minimized, therefore proportionately include not only the investment costs for the machine, the share of which decreases per crankshaft as the machining time falls, but also a cost factor which is affected by the life of the tool and should be minimized.

SUMMARY OF THE INVENTION a) Technical object

The object in accordance with the present invention is therefore to provide a metal-removing machining process for machining crankshafts and similar workpieces, in which a short machining time per crankshaft is possible due to the simultaneous machining by a plurality of tool units, and in which a life of the tools which is of optimum length is made possible while maintaining sufficient dimensional accuracy.

b) Solution to the object

It was necessary in this solution to take into account various negative boundary conditions:

Fudamentally, centric chucking of the crankshaft, that is to say chucking on the centre-bearing axis, is to be preferred to the significantly more complicated eccentric chucking on a big-end journal axis, as is necessary, for example, for machining the big-end journals by means of rotary turn broaching.

It is relatively unproblematical simultaneously to machine, for example, two crankpin journals whose radial positions coincide with respect to with [sic] the centre-bearing axis of the crankshaft and which are merely spaced apart axially. In this case, machining is possible using two analogously guided and driven tool units, for example a tandem tool or a set of tools.

However, not all crankshafts satisfy these geometric preconditions, for which reason it is also intended for it to be possible to machine crankpin journals which do not coincide radially using separate tool units. In this case, the use of processes in which the cutting speed is achieved primarily by the rotation of the crankshaft is problematical, since in that case, given the relatively rapid rotation of the crankshaft, the equally rapid following of the tool units for machining the big-end journals in the X-direction and possibly in addition in the Y-direction is problematical. This consideration favours milling as the machining process. External milling is to be particularly preferred here, owing to the tool being more simple to manipulate and primarily owing to the possibility of also producing planar outer surfaces on the workpiece.

In order further to reduce the machining time when simultaneously using a plurality of tools on the workpiece, it is possible to increase the tool life and/or to increase the metal-removal rate per unit time.

The metal-removal rate per unit time can be increased by increasing the cutting speed, but this as a rule will reduce the cutting life of the tool (total metal-removal volume per tool).

An increase in the chip thickness, which likewise raises the metal-removal rate per unit time, is not possible, since, by contrast, it is desired to reduce the chip thickness with a view to minimizing the cutting forces acting on the workpiece and thus to improving the dimensional accuracy.

It is possible, using the known process of high-speed milling (HS milling), to increase the cutting speed to 350–500 m/min, and sometimes even above these levels, this having been made possible by a positive tool geometry and specific materials for the cutting-tool tips (both base material and coating).

However, particularly in the case of HS milling at 180–800, in particular at 350–500 m/min, tests have shown that although, as previously known, the total metal-removal volume of a tool in principle decreases with increasing cutting speed, nevertheless an optimally high life-cycle performance, that is to say metal-removal volume during the cutting life, of the tool is achieved at chip thicknesses of 0.05–0.4 mm, in particular at 0.1–0.2 mm, with different cutting materials and cutting-material coatings.

Further tests have shown that maintaining this value or range, for example for milling, in which the chip has a thickness which varies as the cut progresses, is sufficient by maintaining [sic] for the average chip thickness, that is to say the arithmetic mean or the integrated mean of the thickness of the chip or the maximum thickness of the chip. While observing this parameter, it is then attempted to keep the cutting speed as high as possible, in order to reduce the machining times.

With the optimum chip thickness determined, it has furthermore proven expedient to carry out the milling as far as possible using the climb-cutting method. This is presumably related to the fact that, with an average chip thickness of, for example, 0.1–0.2 mm, when climb-cutting, and in particular with the positive tool geometry used for HS milling, the cutting forces acting on the workpiece introduce only relatively low dynamic loads into the workpiece, despite the interrupted cut when milling, and also, owing to the biting of the positively formed cutting edge, lateral deflection of the workpiece, which results in dimensional inaccuracies, is as far as possible avoided.

If two milling units which are drivable and operate independently of one another are machining different, eccentric surfaces for machining on one and the same rotatable and drivable crankshaft, and it is intended to maintain an optimum value or range for the chip thickness, under certain circumstances it is only possible to achieve the desired maximum cutting speed, for example the cutting speed of HS milling, at one machining point.

In order to keep the chip thickness or average chip thickness within the optimum range at the other machining points, under certain circumstances the rotational speed of the milling cutter has to be reduced there, and consequently so too does the cutting speed. For this reason, at the start of the journal machining the milling cutter is not moved immediately radially as far as the desired dimension, but rather is moved slowly as far as the radial desired dimension while the crankshaft is rotating slowly, over the course of a rotation of the journal to be machined of 30–90, preferably of 50–70°. As a result, the stipulation with regard to the chip thickness is observed even at the beginning of the machining of a bearing journal, and inadmissibly high transverse forces are not introduced into the workpiece at the start of the machining. After reaching the radial desired dimension, it is necessary to execute a complete cycle of the journal surface, preferably about 100° circumferential surface, in order to achieve an optimum machining result.

If there is no optimum value for the chip thickness with regard to the life-cycle performance of a tool, the independent tool units would be optimized with a view to maximum cutting speed. These laws, which were determined primarily for machining grey cast iron (GGG60–GGG80), may under certain circumstances also be valid for other workpiece materials, such as steel, for which other groups of cutting materials are also employed.

The additional use of a positive tool geometry instead of the negative tool geometry which was previously used in milling and which nevertheless, primarily in connection with the low average or maximum chip thickness, leads to a sufficient tool life of the cutting means, in turn results in a reduction in the cutting forces and consequently also in a reduction in the driving powers required for the tool, which powers, for the size rations indicated, is [sic] only about half to one third of the power required for internal milling or rotary turn broaching. In addition to the lower energy costs, this also minimizes the waste heat problems of the drives, which always have a negative effect on the overall machine and the machining result.

The high-speed milling according to the invention may in this case be carried out, in particular, not only on the unhardened workpiece but also on the hardened (e.g. Rockwell hardness $H_{RC}$ of 60 to 62, in particular fully hardened) workpiece. In this case, the cutting material preferably used is cermet or polycrystalline boron nitride (PCB), and in the case of the latter in particular cubic boron nitride (CBN). In this case, it is preferably firstly to sinter a carbide cutting tool tip as usual which, however, has cavities in the cutting-edge area, e.g. in the tool face open towards the cutting edge. CBN powder is placed in these cavities in the base body and is then sintered.

It is not only the noses of throw-away cutting tool tips which can be reinforced in this manner, but also an entire cutting edge can be reinforced by arranging a plurality of CBN pallets [sic] next to one another along a cutting edge, or else by providing a bar-shaped CBN insert. It is consequently also possible to machine unhardened steel or cast iron, even by milling.

These cutting materials can also be used without cooling lubricant, that is to say dry, thus saving on disposal costs and environmental problems.

It is thus possible even as early as during the metal-removing machining to eliminate the distortion of the workpiece which due to the hardening process occurs in conventional production (metal-removing machining prior to hardening). Since, when using high-speed milling and in particular when using high-speed milling on the hardened workpiece, it is possible to achieve surface qualities which are acceptable as the final state of the workpiece, it is consequently possible to dispense with at least the rough-grinding operation altogether.

When machining the journal and web surfaces on crankshafts which consist of cast iron or steel and are machining [sic] in the unhardened state by means of an external circular-milling cutter, in particular by means of a disc-like milling cutter with cutting edges on the circumferential region, it has proven particularly advantageous to observe the following parameters:

- Cutting speed during the roughing machining: at least 180, preferably 250–600 m/min,
- Cutting speed during the finishing machining: at least 200, preferably 300–800 m/min,
- Chip thickness: 0.005–0.5 mm, in particular 0.1–0.3 mm.

The tool used here is generally a disc-like tool body driven in rotation and having inserted throw-away cutting tool tips. In this case, the configuration of the cutting tool tips differs depending on their intended purpose (machining of the end faces on the webs, machining of the peripheral surfaces on the journals of the main bearing point and big-end journal points, production of the undercuts at the transition between peripheral surfaces and end faces) and they are also positioned differently with respect to the tool carrier or to the workpiece:

|  | cutting tip Undercut-Web-cutting tip | | (face-cutting cutting tip) | | Journal-tip | |
|---|---|---|---|---|---|---|
|  | from/to | esp. | from/to | esp. | from/to | esp. |
| Basic material | K20–K25 | | K15 | | K10–K15 | |
| Coating | TiCN + Al$_2$O$_3$ + TiN or TiN + TiCN + Al$_2$O$_3$ or TiN + Al$_2$O$_3$+ TiN | | TiN | | TiCN + Al$_2$O$_3$+ TiN or TiN + TiCN + Al$_2$O$_3$ +TiN or TiN + Al$_2$O$_3$+ TiN | |
| Total thickness of the coating | 3–15 μm | 10–12 μm | 2–8 μm | 3–5 μm | 2–8 μm | 3–5 μm |
| $\gamma_p$ | +1° . . . +8° | +5° | +4° | +4° | +2° | +2° |
| $\gamma_f$ | −4° . . . +4° | −1° | +1° | +1° | +2° | +2° |
| $\gamma_n$ | +5° . . . +14° | +9° | +9° | +9° | +9° | +9° |
| $\lambda_s$ | +2° . . . +7° | +5° | +5° | +5° | +3° | +3° |
| κ | about +2° | 5° | | 4° | — | |
| Cutting edge rounding | 0.01–0.05 mm | about 0.02 mm | about 0.02 mm | about 0.02 mm | about 0.02 mm | about 0.02 mm |

-continued

|  | cutting tip Undercut-Web-cutting tip | | (face-cutting cutting tip) | | Journal-tip | |
|---|---|---|---|---|---|---|
| (CRE) Nose radius R | 1.2–2.0 mm | 1.6 mm | 1.6 mm | 1.6 mm | — | — |
| Length min. 10 mm | | 15.9 mm | 15.9 mm | 15.9 mm | 12.7 mm | 12.7 mm |
| Height min. 10 mm | | 12.7 mm | 12.7 mm | 12.7 mm | 12.7 mm | 12.7 mm |
| Thickness min. 3 mm | | 6.35 mm | 5.55 mm | 5.55 mm | 4.7 mm | 4.7 mm |

Data with regard to the tool body:

|  | | | |
|---|---|---|---|
| Width of cut | 23 mm to 22 mm | — | 13 mm (split) (complete) |
| Nominal diameter | e.g. 800 mm | e.g. 800 mm | e.g. 800 mm |
| Pitch angle from cutting edge to cutting edge | 3.6° | 5.5°–7.5° | 5.5°–7.5° |
| Pitch spacing from cutting edge to cutting edge | 25 mm | 35–50 mm | 35–50 mm |
| Number of cutting tips | e.g. 200 | e.g. 120 (split) to 200 (complete) | e.g. 120 (split) to 200 (complete) |

Data on the basic material relates to the known ISO application groups, in which:

K10: consists of 94.2% tungsten carbide (TC), 5.5% cobalt (Co) and 0.3% . . . (Ta/C)

K20: consists 93.2% TC, 6% Co and 0.6% Ta/C and 0.2% titanium carbide (TiC)

The flexural strength is 1900 N/m$^2$ for K10 and 2000 N/m$^2$ for K20.

In the coatings specified, the individual compounds are applied in layers one after the other in the sequence specified from the inside outwards.

BRIEF DESCRIPTION OF THE DRAWINGS

An embodiment in accordance with the invention is described in more detail by way of example below, with reference to the figures, in which.

DESCRIPTION OF THE PREFERRED EMBODIMENTS

Figure 1:
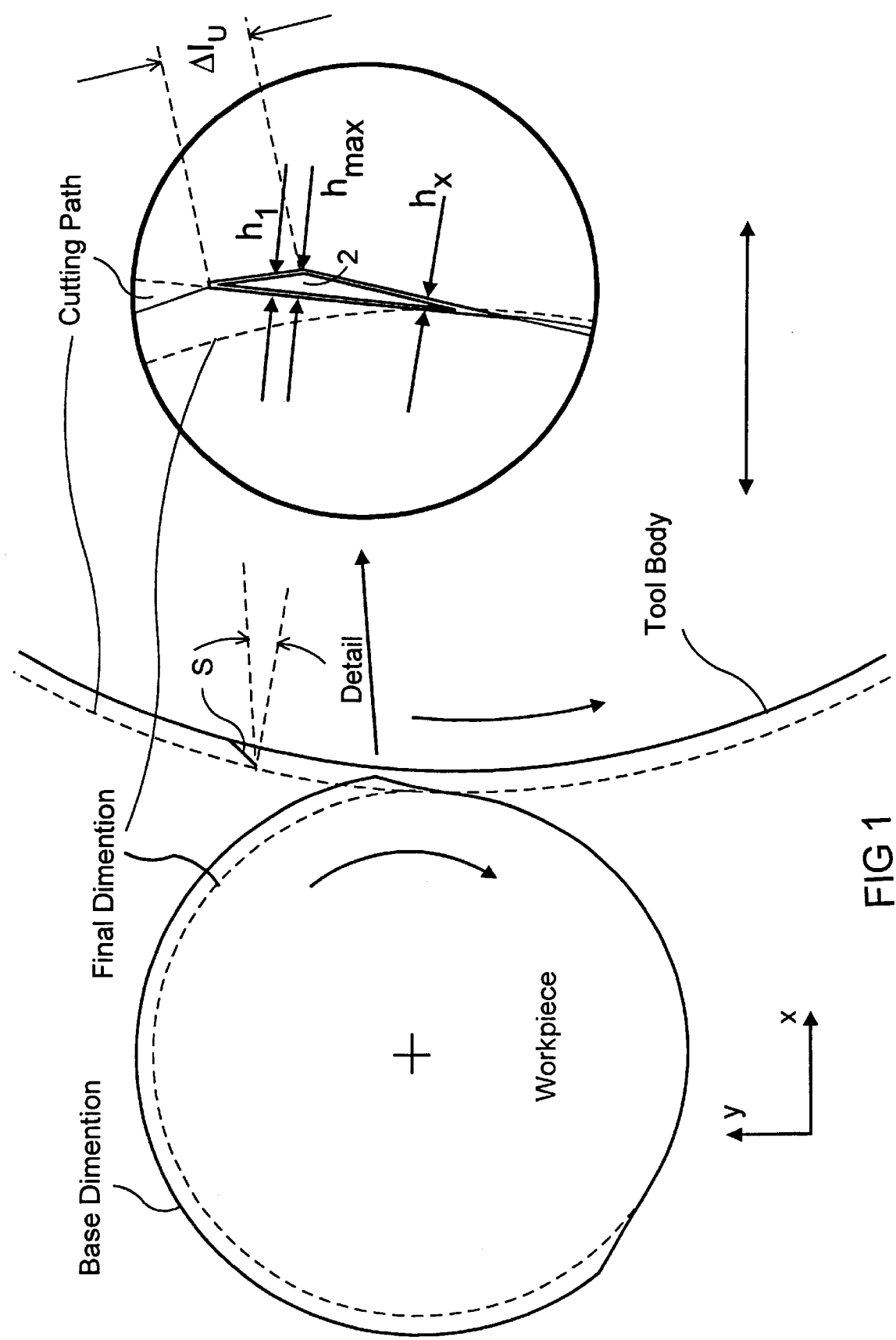
FIG. 1 shows a schematic depiction of climb-cutting external milling on a crankshaft journal.

In the direction of viewing of the Z-axis, FIG. 1 shows the fundamental situation for the machining of a circumferential surface, for example of the journal of a crankshaft, but also of a non-round circumferential surface, by means of external milling. An enlarged illustration of the machining point is depicted in the right-hand part of FIG. 1.

The workpiece is intended to be machined from the larger base dimension to the smaller final dimension.

In this case, the cutting edges S, only one of which is drawn in, protrude radially beyond the tool body, in order to be able to effect this abrasion. The tool body is in this case displaceable in a defined manner in the X-direction and rotates anticlockwise. Since the milling is intended to take place on a climb-cutting basis, the workpiece rotates in the clockwise direction, so that at the machining point tool and workpiece are moving in the same direction.

As shown by the enlarged depiction, the new cutting edge S will produce a chip 1 [sic], which is delimited in cross-section by two convex and one concave curved segments and has the form of a flat, irregular triangle.

In this case, the concave side is the flank produced by the preceding cut, and the long convex side is the flank produced by the the [sic] new cutting edge S. The short convex flank is the length $\Delta I_u$ measured along the circumference of the branch piece, that is to say the circumferential length between two successively arranged cutting edges of the tool striking the circumference of the workpiece.

In practice, of course, the chip 1 [sic] does not retain the shape which can be seen in FIG. 1, but rather is rolled up spirally owing to the deflection at the tool face of the cutting edge.

It can be seen from FIG. 1 that the chip thickness, e.g. $h_1$, of the chip 2—viewed in the passage direction of the cutting edge—increases rapidly up to the maximum chip thickness $h_{max}$. From there, the chip thickness decreases relatively slowly and continuously to the end (e.g. $h_x$).

If the difference between the base dimension and the final dimension remains the same and the rotational speed of the workpiece likewise remains the same, it can be seen from this illustration that a reduction in the rotational speed of the tool has the effect of increasing the cut distance $\Delta I_u$ and thus also of increasing $h_{max}$.

Figure 2:
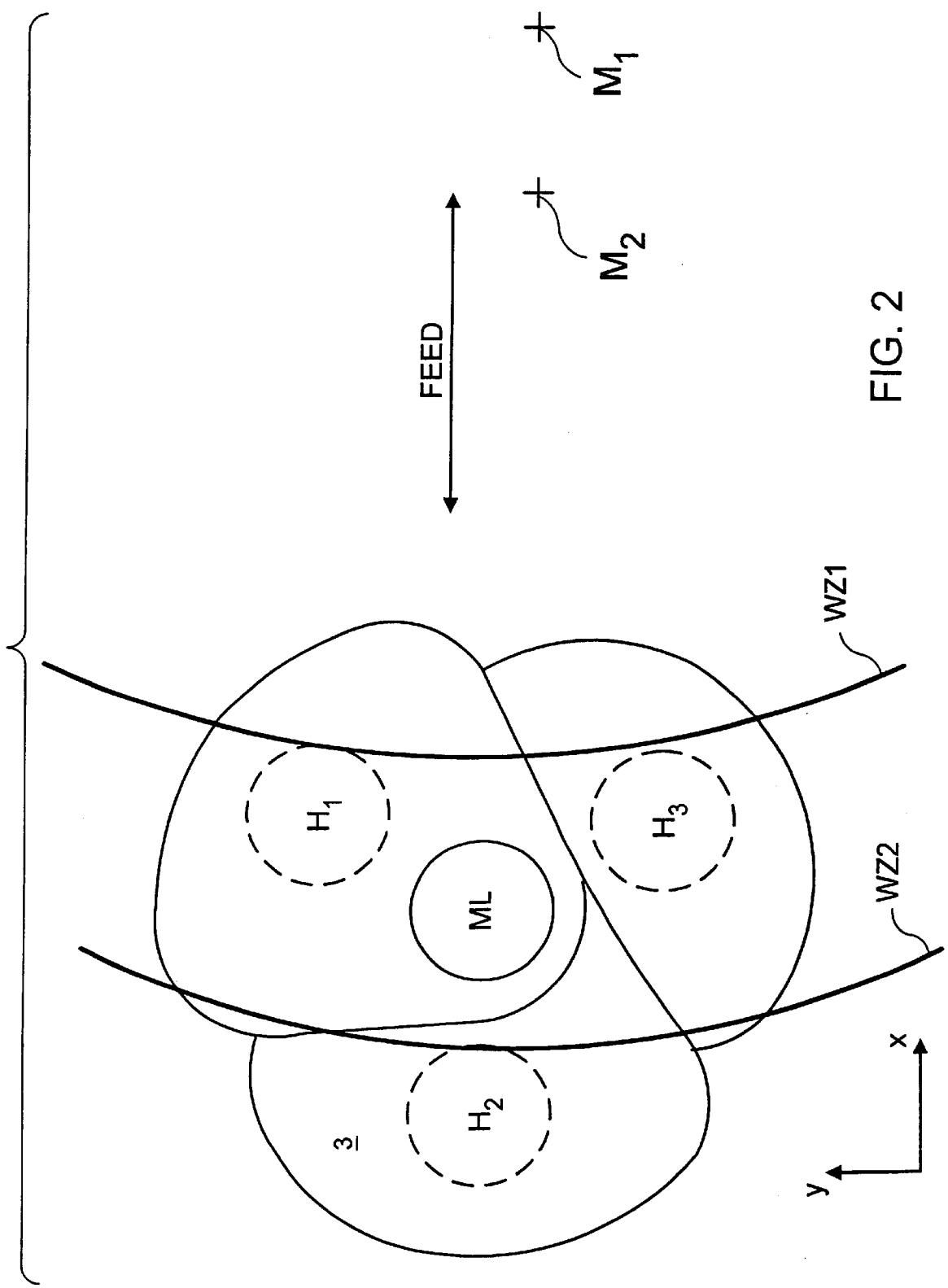
FIG. 2 shows a schematic depiction while simultaneously machining two different crankpin journals.

Again viewed in the Z-direction, FIG. 2 illustrates, for example, a crankshaft for a 6-cylinder in-line engine having three crankpin journals H1–H3 with different rotational positions with respect to the centre bearing ML.

Two separate tools, for example disc-like external-milling cutters (WZ1, WZ2), are being used on this crankshaft at different axial positions. One of the tools could, for example, machine the crankpin journal H1, and the other the crankpin journal H2, as illustrated in FIG. 2, but it would also be possible for one of the tools to machine a crankpin journal and the other of the tools to machine the end face of a web.

In the latter case, the machining of the web could in theory take place partially with the crankshaft stationary, in that the relevant tool WZ1 or WZ2 works along the end face of the web in the feed direction, that is to say in the X-direction. However, since if the crankshaft is stationary it is not possible to achieve any progress with the machining, taking place at a different axial position, of a peripheral surface, whether of a crankpin journal H or of a centre bearing ML, the machining of the web surface is preferably also carried out with the crankshaft rotating.

If the machining of the web starts in that position of the crankshaft which is illustrated in FIG. 2 and then the crankshaft rotates further, the result is the cutting paths $s_a$, $s_b$, $s_m$, $s_x$, some of which are drawn in FIG. 2.

As can be seen, these cutting paths, owing to the climb-cutting operation of the milling cutter, together with the rotation of the workpiece, are at a greater distance apart at the point where they begin than at the point where they end, that is to say the point at which the cutting edge leaves the side face of the web.

Figure 3:
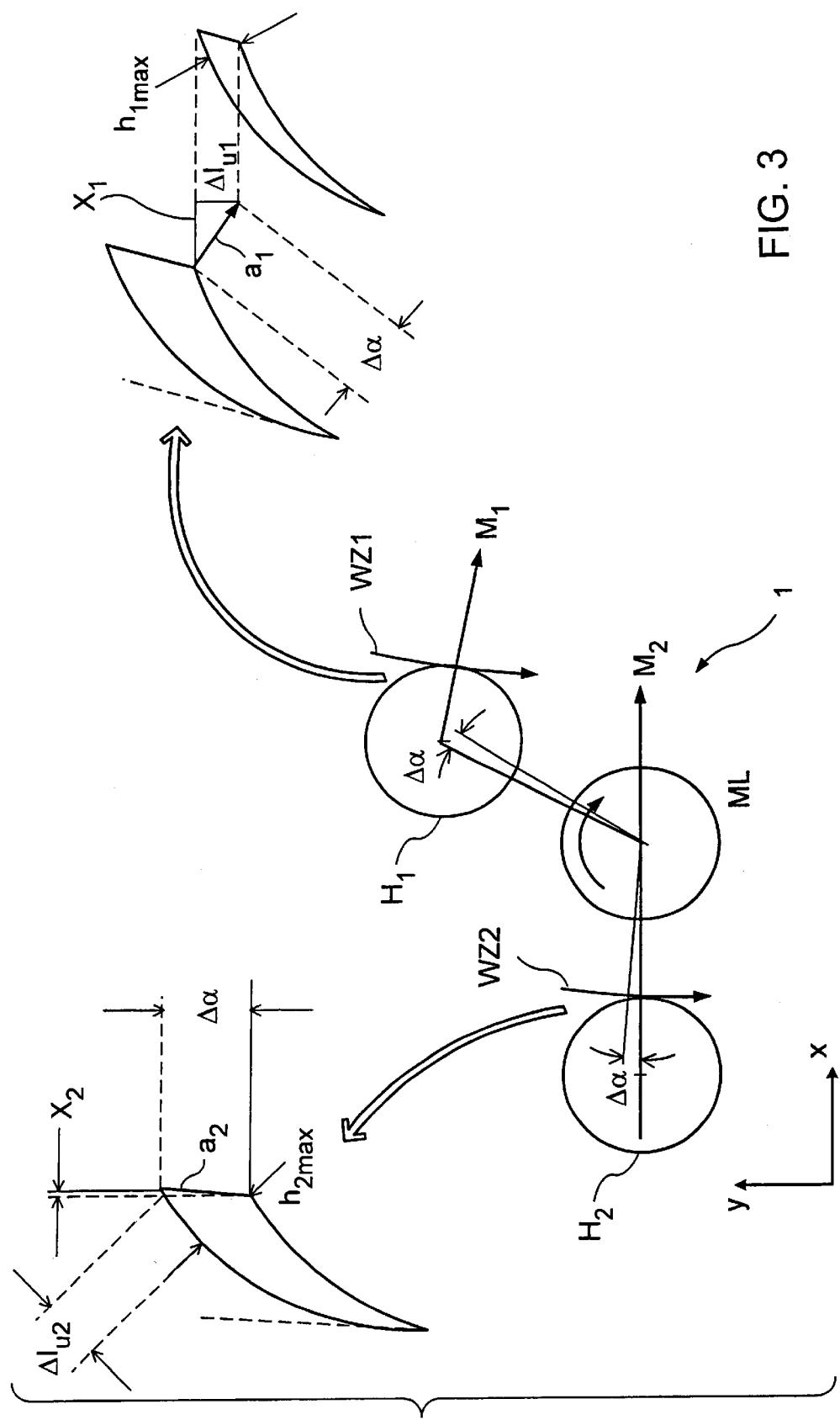
FIG. 3 shows detailed depictions of two different machining points.

FIG. 3 shows the relationships when two separate tools WZ1, WZ2 are simultaneously machining two different crankpin journals H1, H2. Independently of one another the tools WZ1 and WZ2 can move in a defined manner in the X-direction and their rotational speed can be controlled. However, the parameter which links them is the rotation of the crankshaft, as the workpiece, which is driven in rotation, likewise in a controlled manner, about the centre bearings, which rotation can also be stopped for certain machining operations.

In the situation illustrated in FIG. 3, crankpin journal H2 is situated in line with the centre bearing ML1 and the centre point $M_1$ and $M_2$ of the tools WZ1 or WZ2. The crankpin journal H1 is offset through about 120° in the clockwise direction with respect to the centre bearing.

If, as indicated, the tools WZ1 and WZ2 are each rotating anticlockwise and the crankshaft—as drawn in at its centre bearing ML—is rotating in the clockwise direction, the big-end journal H1 is clearly being milled by a climb-cutting method, which effect is desirable for the reasons given above.

For the big-end journal H2, one could gain the impression that it is subject to ordinary milling, since at this point the tool WZ2 is moving downwards but the crankpin journal H2 is moving upwards.

However, the absolute movement of the crankpin journal is not the deciding criterion in assessing whether ordinary or climb-cutting is taking place, but rather the important factor is whether the big-end journal H2 is rotating about its own centre point allowing its surface at the machining point still to move in the same direction as the milling cutter.

However, viewed in absolute terms, the crankpin journal H2, which is migrating upwards in FIG. 3, is clearly rolling upwards along the tool WZ2, so that, therefore, the big-end journal is rotating in the clockwise direction relative to the centre point of the big-end journal H2 and therefore de facto climb-cutting is the prevailing circumstance at the machining point.

FIG. 3 furthermore shows the relationship which is necessarily present between the machining on the two big-end journals H1 and H2, which relationship is to be taken into account primarily in optimizing a plurality of machining operations which take place simultaneously with regard, for example, to a specific chip thickness.

It has been assumed that the milling cutter WZ2 in relation to the crankshaft 1—of which only the centre bearing ML and the two crankpin journals H1 and H2 currently being machined are shown in FIG. 3, for the sake of clarity—are [sic] rotating so quickly with respect to one another that the crankshaft has been rotated further through the angle $\Delta\alpha$ between the engagement of two successive cutting edges of the tool WZ2 on the big-end journal H2. Since in FIG. 3 the centre point of the big-end journal H2 and the centre point of the crankshaft, that is to say of the centre bearing ML, are in line with the centre M2 of the tool WZ2, the pivot angle $\Delta\alpha$ provides an offset $a_2$ of the point where the new cutting edge strikes with respect to the old cutting edge, which runs almost precisely in the Y-direction.

As a result, it is only necessary for there to be a very small X-component $x_2$ by means of a corresponding X-movement of the tool WZ2, and the resultant cutting distance $\Delta l_{U2}$ determines a chip cross-section, the thickness of which is intended to correspond to the optimum chip thickness.

It is also intended, as far as possible, for the same chip thickness to be achieved at the machining point of the crankpin journal H1. Assuming that the rotational speed and diameter of the tools WZ1 and WZ2 are the same, the centre point of the crankpin journal $H_1$ has also been pivoted through the angle $\Delta\alpha$ with respect to the centre of the big-end journal by the time that the next cutting edge of the tool WZ1 comes into action.

The offset $a_1$ thus brought about at the machining point is in this case greater to only a negligible extent than $a_2$, since the distance from the centre of the centre bearing ML to the machining point on the big-end journal H1 is slightly greater than the distance to the centre of the big-end journal $H_1$. This offset $a_1$ has a pronounced component $x_1$ in the X-direction, which component has to be compensated for by a corresponding movement of the tool WZ1 in the X-direction. Thus only a relatively small component of $a_1$ remains as the cutting distance $\Delta l_{U1}$ in the Y-direction. This would result in the thin chip, which is illustrated to the outside on the right-hand side in FIG. 3, with a maximum thickness of only $h_{1max}$, which is much smaller than the optimum chip thickness.

In order to reach the optimum chip thickness at this machining point too, the rotational speed of the tool WZ1 has to be reduced by comparison with the rotational speed of WZ2, so that the cutting distance $\Delta l_{U1}$ increases to such an extent that the desired chip thickness is also achieved on the crankpin journal $H_1$. It is necessary here to reduce the rotational speed of tool WZ1 to a maximum of about 30% of the rotational speed of tool WZ2.

In addition to the first optimization target described of a specific—average or maximum—chip thickness, the secondary optimization target could be a cutting speed which is intended to move within a predetermined target corridor or is intended not to exceed a specific maximum value.

In the former case, this would lead, in the case of the machining illustrated in FIG. 3, to the rotational speeds of the workpiece and of the tool WZ2, during the machining of the big-end journal H2, being increased with respect to one another—such that the desired chip thickness is maintained on the big-end journal H2, to such an extent that the rotational speed of tool WZ2 moves at the upper end of the specified range for the cutting speed. This also results in an increase in the rotational speed of the tool WZ1, as a result of which the cutting speed on the crankpin journal $H_1$ should likewise still lie within the specified range for the cutting speed.

By contrast, if an upper limit is specified for the cutting speed, this upper limit would be applied to the machining on the crankpin journal $H_2$, which has a higher cutting speed by comparison with the machining on the crankpin journal $H_1$, so that, as a result, an absolute upper limit of the cutting speed is automatically observed at both machining points present.

In the event of more than two points on a crankshaft being machined simultaneously, in an analogous manner the limiting criterion for absolute maximum or minimum values is always to be applied to the machining point which has the relatively highest or lowest corresponding value.

When specified ranges of certain cutting parameters are being applied, it may be that it is not possible to observe this range for all the machining points. In this event, either the specified range width should be increased or a third-priority optimization parameter has to be specified. This third optimization variable could, for example, be the chip length (primarily in the case of the machining of web side faces).

Figure 4:
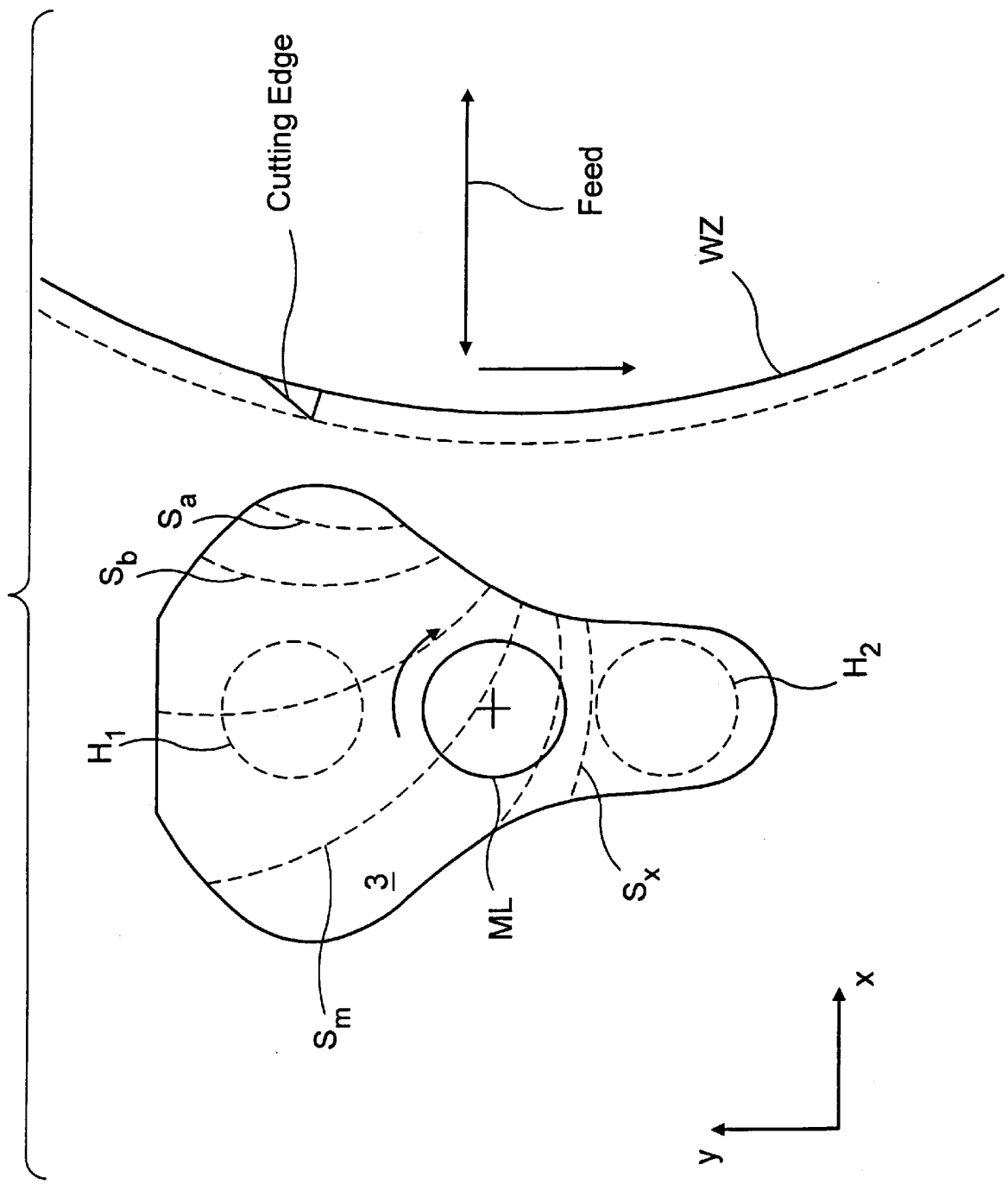
FIG. 4 shows a curve of motion during the machining of a journal.

The mutual dependencies illustrated in FIG. 3 when observing a specific chip thickness occur to an increased extent when one of a plurality of simultaneous machining points on the crankshaft is the machining of an end face of a web, as illustrated in FIG. 4. The illustration in FIG. 4 shows a crankshaft, for example for a four-cylinder in-line engine, in which the crankpin journals H1 and H2 are situated opposite one another, in the radial direction, with respect to the centre bearing ML.

If, in the position illustrated in FIG. 4, one were to begin machining the web surface 3 by means of the tool WZ, the crankshaft would rotate further in the direction indicated (in the clockwise direction) about the centre of the centre bearing ML, while the tool WZ is rotating anticlockwise, in order to bring about climb-cutting milling.

Some of the resultant cutting paths $s_a$, $s_b$, $s_m$, $s_x$ are drawn in on the web surface 3.

The simultaneous rotation of the crankshaft results in chip cross-sections which are again considerably larger at the start of the chip than towards the end of the chip, and in addition the chips differ considerably in their length, depending on the respective position of the cutting path on the web surface 3.

As a rule, it is not possible to dispense completely with a rotation of the crankshaft, since otherwise a machining operation, currently taking place at a different point of the crankshaft, on a bearing journal would no longer produce any progress in the machining.

Therefore, if, on a crankshaft, a plurality of web side faces or one web side face takes place [sic] at the same time as the machining of a bearing journal, the discrepancies in chip thicknesses between the various machining points, given identical rotational speeds and diameters of all the tools, which discrepancies were illustrated with reference to the example of FIG. 3, occur to an increased extent, so that it is necessary to an increased extent for the rotational speeds, and/or in the case of the machining of a web also the movement in the transverse direction, that is to say the X-direction, by the milling cutter, to be adjusted continually, in order to observe the desired optimum chip thickness in each phase of the machining and at all the machining points at the same time.

Figure 5:
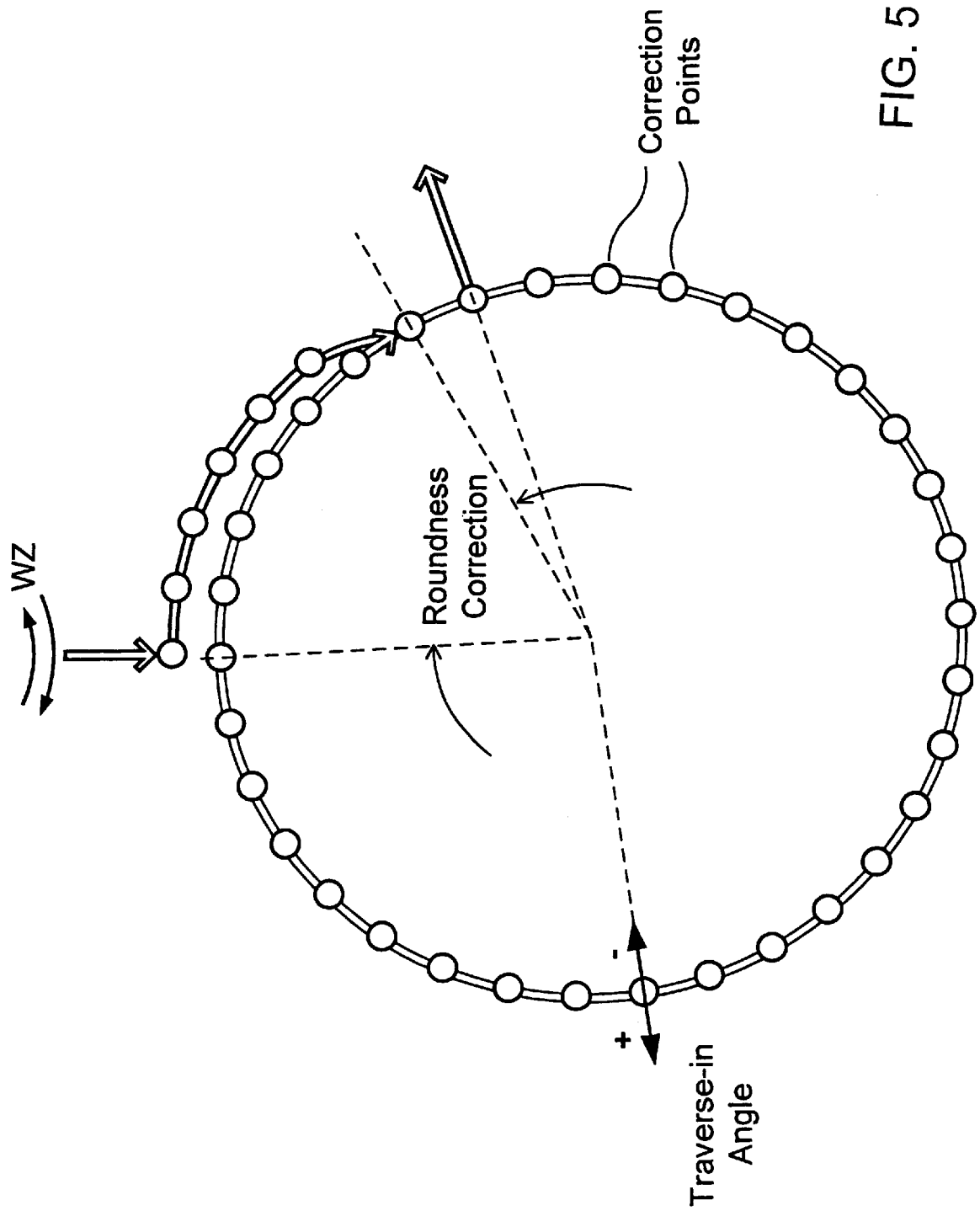
FIG. 5 shows a depiction of the curve of motion during the milling of a journal.

As shown by FIG. 5, in order to protect the workpiece, the procedure is as follows even at the start of the machining of the peripheral surface, for example of a bearing journal:

Despite the rotation of the workpiece, the milling cutter is fed in relatively slowly as far as the desired radial dimension. A radial in-feed which is too quick would not only increase the chip thickness to unacceptable levels but also, above all, the corollary transverse forces which are introduced into the workpiece would become relatively high, due to the chip length, which is then considerable owing to the relatively great wrap between a disc-like external-milling cutter, which rotates about an axis parallel to the bearing-journal axis, and the current machining point.

As shown by FIG. 5, the milling cutter is moved forwards radially towards the centre point of the bearing journal to be machined so slowly that the existing extent is acted on by the milling cutter only after a traverse-in angle of about 50–70, preferably about 60°, of the bearing-journal circumference. Starting from this point, it is necessary to execute a complete revolution of the bearing journal to be machined, and preferably slightly more, that is to say about 370°, in order to achieve optimum adaptation of the actual contour to the desired contour of the journal. The milling cutter can then traverse directly radially outwards.

In addition, correction points with an intervening angle of about 10–15° with respect to the centre point of the crankpin journal to be machined are arranged along the machining path.

After producing the first components of a series to be machined, the extent to which the actual circumferential contour approaches the desired circumferential contour can be measured and the actual contour achieved can subsequently be corrected empirically by modifying each of the individual correction points, by entering corresponding correction values for the individual correction points into the machine control system.

Furthermore, in FIG. 4 the circumferential contour of the web is flattened off at one point in a planar manner. The circumferential contour of the web surface is also partially machined by means of external milling. The external milling according to the invention makes it possible—by means of a corresponding control of the rotational position, that is to say of the rotational speed of the crankshaft in relation to the X-displacement of the milling cutter—not only to achieve any desired (that is to say outwardly curved) contour, but also to achieve planar flattened portions which lie, for example, tangentially with respect to the centre bearing ML of the crankshaft. Planar milled areas of this kind are required either for the subsequent attachment of, for example, counterweights, or else for balancing the crankshaft directly in the chucking of the metal-removing machining operation.

It is even possible to produce concave, that is to say recessed, circumferential contours, as long as the radius of curvature thereof is greater than the radius of the disc-like external-milling cutter.

Figure 6:
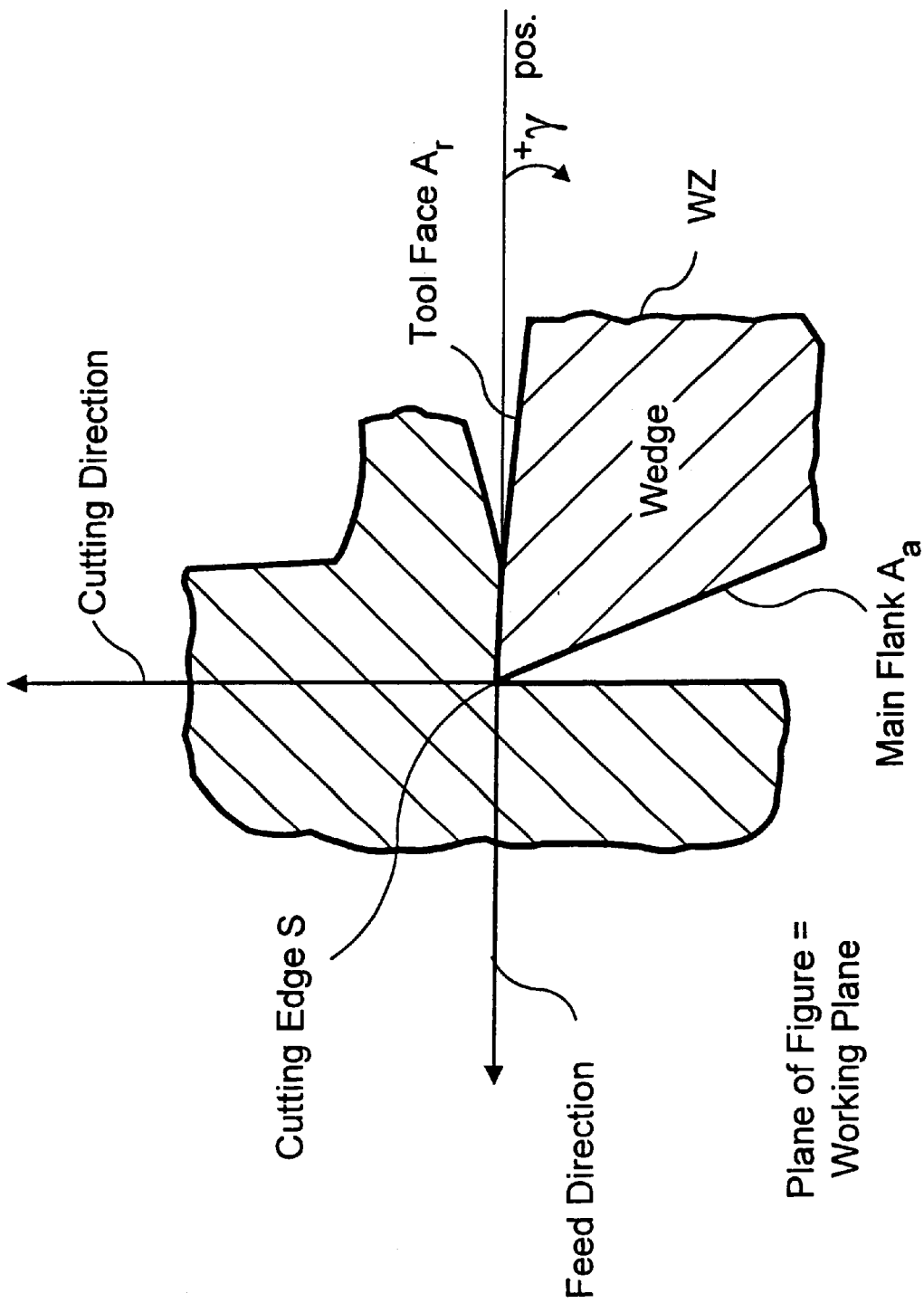
FIG. 6 shows a schematic depiction of the wedge of the tool.

FIG. 6 shows a section through a metal-removing tool WZ, for example a turning tool, most designations and angles applying both to turning and to milling. Here, the cutting edge, for example the main cutting edge S, is formed by the edge formed by the tool face $A_\gamma$ and the main flank $A_\alpha$, and the secondary cutting edge S' is formed by the tool face $A_\gamma$ and the secondary flank $A'_\alpha$ running at an angle to the main flank $A_\alpha$. The cutting edge S, which in FIG. 6 is shown as a sharp edge, is in practice never completely sharp, but rather has to have a certain degree of rounding, the cutting edge rounding (CER), in order to prevent the cutting edge chipping.

Figure 7:
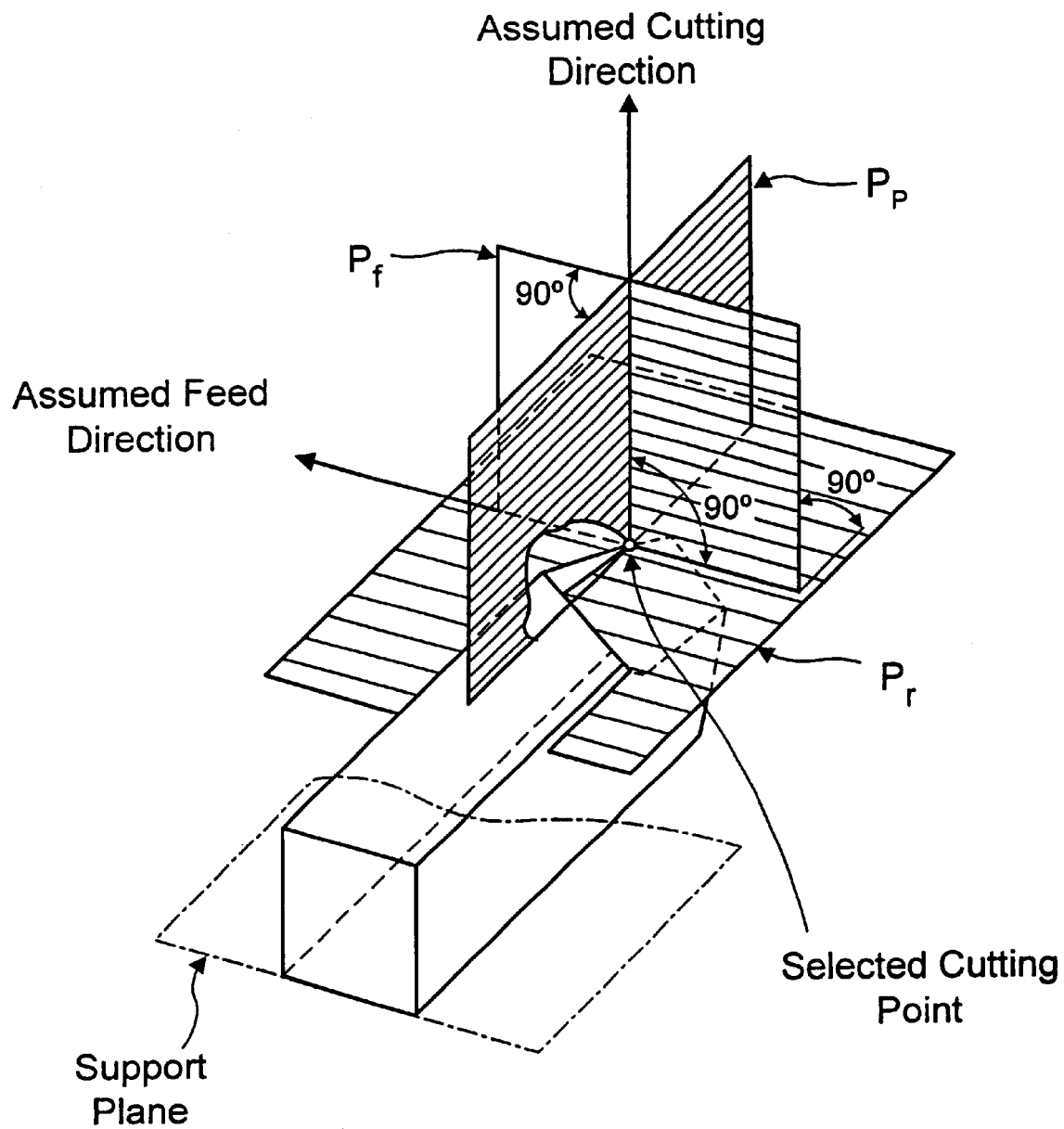
FIGS. 7 and 8 show defined planes in the tool reference system.
Figure 8:
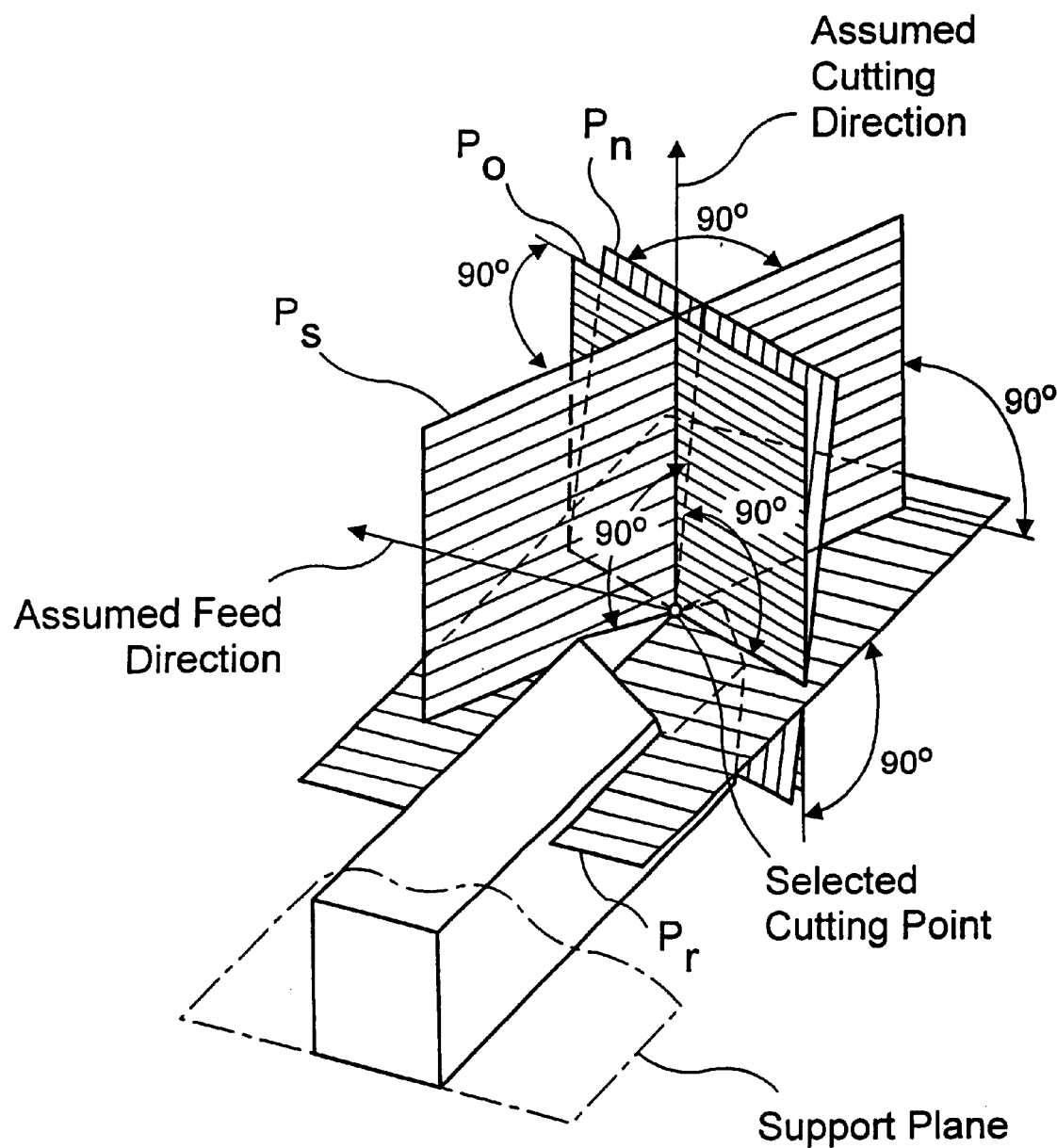

Various directions and planes with respect to the tool are defined in FIGS. 7 and 8.

In these Figures, the tool reference plane $P_r$ is a plane through the selected cutting-edge point, specifically perpendicular to the assumed cutting direction. The tool reference plane $P_r$ is in this case as far as possible selected such that it lies parallel or perpendicular to an axis of the tool. It has to be stipulated individually for each type of tool. In the case of turning tools, the tool reference plane $P_r$ is a plane parallel to the base of the shank for conventional turning tools, while in the case of milling tools it is a plane which contains the axis of the milling tool.

The assumed working plane $P_f$ is a plane through the selected cutting-edge point, perpendicular to the tool reference plane $P_r$ and parallel to the assumed feed direction.

The tool rear plane $P_p$ is a plane through the selected cutting-edge point, perpendicular to the tool reference plane $P_r$ and perpendicular to the assumed working plane $P_f$. $P_r$, $P_p$ and $P_f$ thus form a coordinate system through the assumed cutting-edge point.

The tool cutting-edge plane $P_s$ (see FIG. 8) is a plane through the cutting-edge point, tangential with respect to the cutting edge S and perpendicular to the tool reference plane $P_r$. If the tool cutting edge S is at right angles to the feed direction, tool cutting-edge plane $P_s$ and tool rear plane $P_p$ coincide.

The tool orthogonal plane $P_o$ is a plane through the cutting-edge point, perpendicular to the tool reference plane $P_r$ and perpendicular to the tool cutting-edge plane $P_s$. Therefore, if the tool cutting-edge S is at right angles to the feed direction, tool orthogonal plane $P_o$ and assumed working plane $P_f$ coincide.

Figure 9:
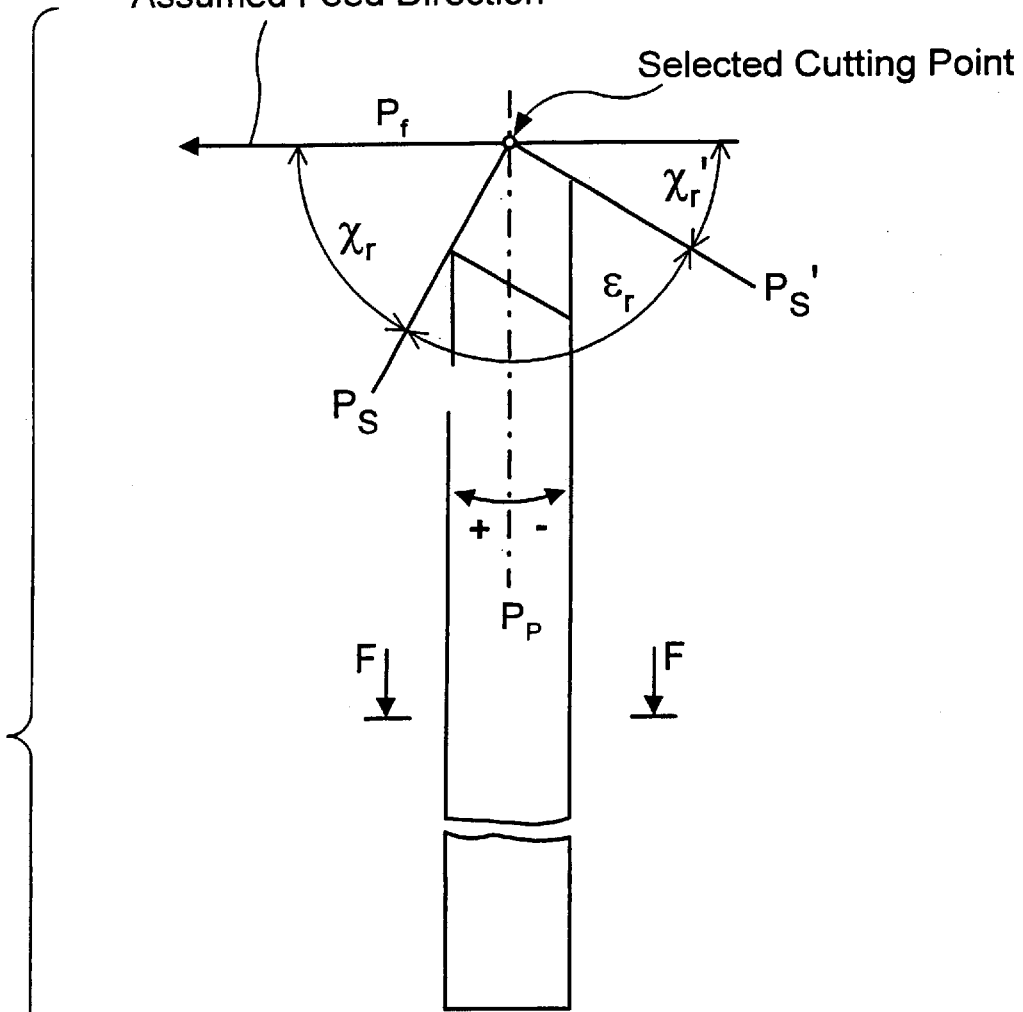
FIGS. 9 and 10 show the angular position of the cutting edge in the tool reference system, using the example of a turning tool for plain turning (FIG. 9) and face turning (FIG. 10).
Figure 9:
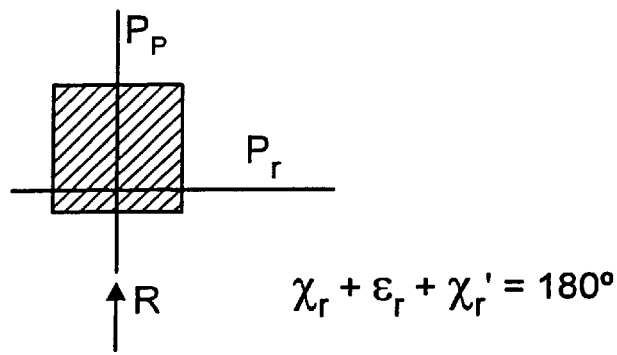
Figure 10:
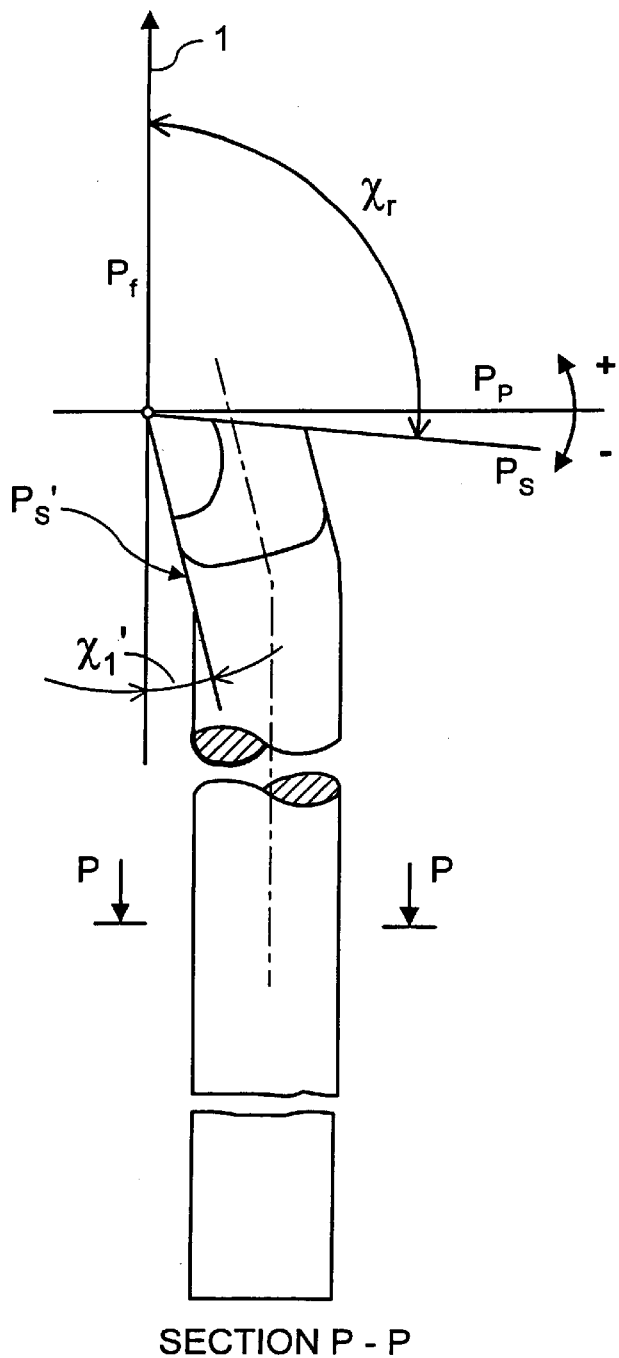
Figure 10:
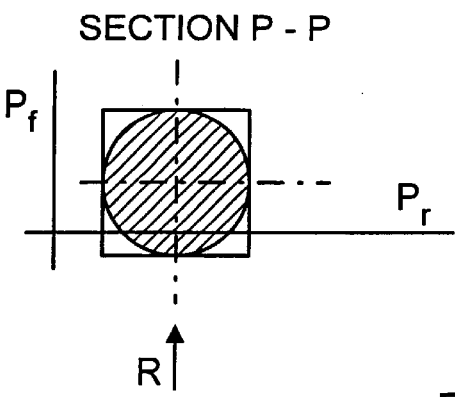

The orientation of the individual tool cutting edges with respect to the workpiece can be seen more clearly from FIGS. 9 and 10, separately for plain turning and face turning. Considered in this plan view, the tool has at its cutting-edge point a tool nose angle $\epsilon_r$ between the tool cutting-edge plane $P_s$ of the main cutting edge and the tool cutting-edge plane $P'_s$ of the secondary cutting edge, measured in the tool reference plane $P_r$.

In this case, the main cutting edge is at a tool adjustment angle $\kappa_r$ between the tool cutting-edge plane $P_s$ and the assumed working plane $P_f$, measured in the tool reference plane $P_r$.

FIGS. 12a–12f directly show the position of the individual sections and views, some of which are from FIGS. 9 and 10.

The relevant angles here are:

Tool side rake $\gamma_f$: angle between the tool face $A_\gamma$ and the tool reference surface $P_r$, measured in the working plane $P_f$;

Tool rear rake $\gamma_p$: angle between the tool face $A_\gamma$ and the tool reference plane $P_r$, measured in the tool rear plane $P_p$;

Tool normal cutting rake $\gamma_n$: angle between the tool face $A_\gamma$ and the tool reference plane $P_r$, measured in the tool cutting-edge normal plane $P_n$; the value of this angle $\gamma_n$ (positive or negative) is usually referred to in a generalized way as "positive/negative tool geometry".

Tool cutting-edge angle of inclination $\lambda_s$ (FIG. 12e): angle between the cutting edge S and the tool reference point $P_r$, measured in the tool cutting-edge plane $P_s$.

This tool cutting-edge angle of inclination $\lambda_s$ is an acute angle, the point of which faces towards the tool nose. It is positive when the cutting edge, to be viewed starting from the tool nose, lies on that side of the tool reference plane $P_r$ which faces away from the assumed cutting direction.

α generally denotes the clearance angle of a cutting edge.

FIG. 13 shows a web-cutting tip, which is screwed on the end side, preferably on both sides, onto the disc-like base body of the milling cutter and thus protrudes beyond the base body both radially and on the end side. In order to abrade the material from the end face of the web, with the milling cutter rotating the latter is moved forwards in the X-direction, that is to say radially with respect to the workpiece, as the feed direction. Here, the plane of the bit-like web-cutting tip, i.e. the tool cutting-edge plane $P_s$, is positioned at a small angle κ to the working plane $P_f$, which is composed of the feed direction (X-direction) and the cutting direction, which lies in the X-Y plane. As a result, the outer edge, which is rounded with the nose radius R of about 1.6 mm, of the cutting bit projects obliquely outwards from the base body and forms the point which protrudes furthest axially with respect to the base body of the milling cutter.

The larger the angle κ, the more wavy the machined end face of the web becomes, as can be seen from the already machined part in FIG. 13.

Figure 13A:
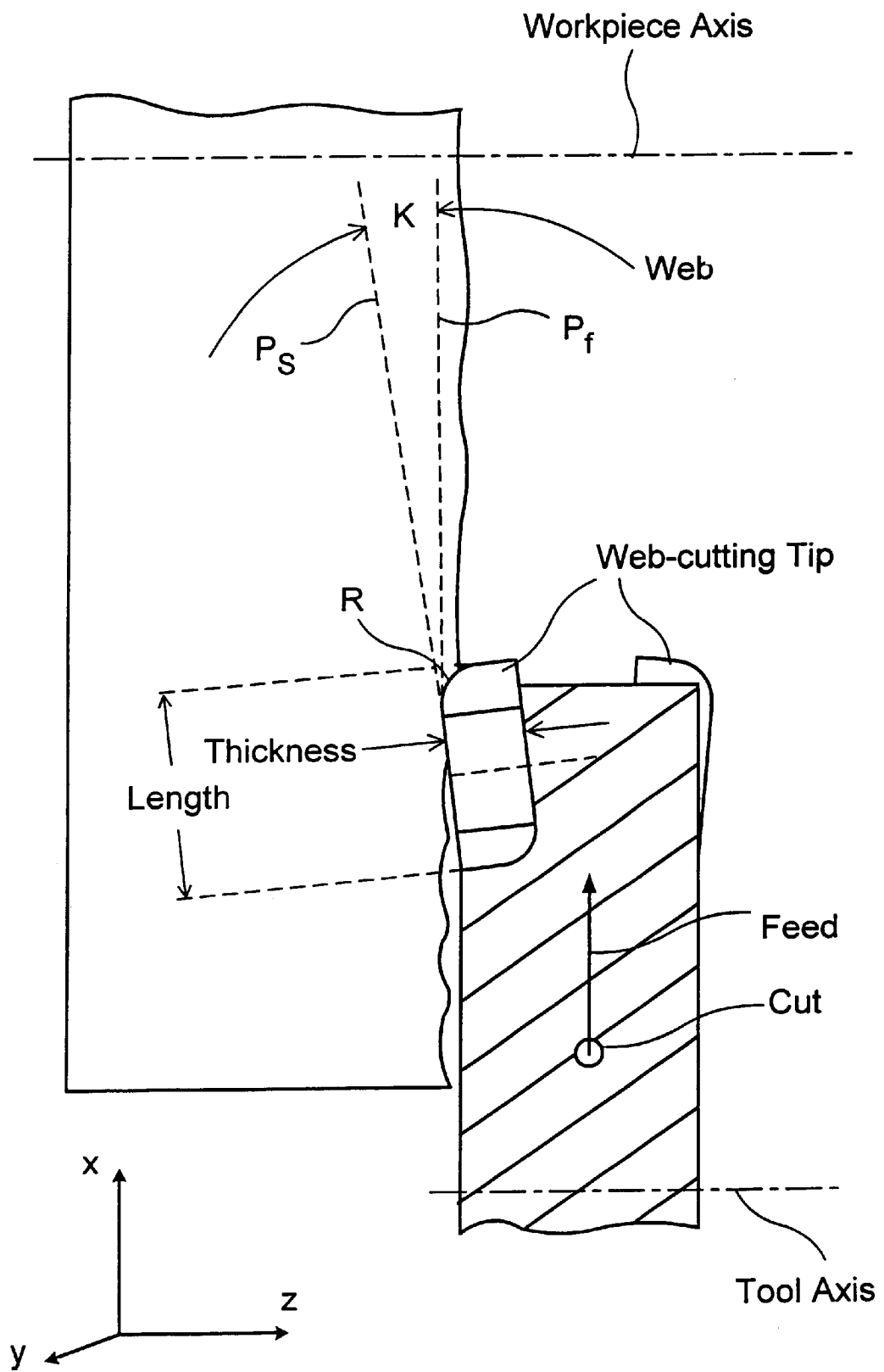
FIG. 13a shows the insert of a web-cutting tip, viewed in the Y-direction.

In order to be able to machine the entire end face of a web, an additional rotation of the crankshaft may additionally be necessary as well as the feed, depicted in FIG. 13a, in the X-direction of the milling cutter, if, for example, it is intended to machine the web surface as far as the crankpin journal $H_2$ and around the latter.

In the case of a web-cutting tip as shown in FIG. 13a, the extent of the tip in the radial direction of the body of the milling cutter is referred to as the length of the cutting tip, the extent in the tangential direction of the disc-like body of the tool is referred to as the width, and the extent in the direction of the cutting bit closest to the axial direction is referred to as the thickness.

Figure 13B:
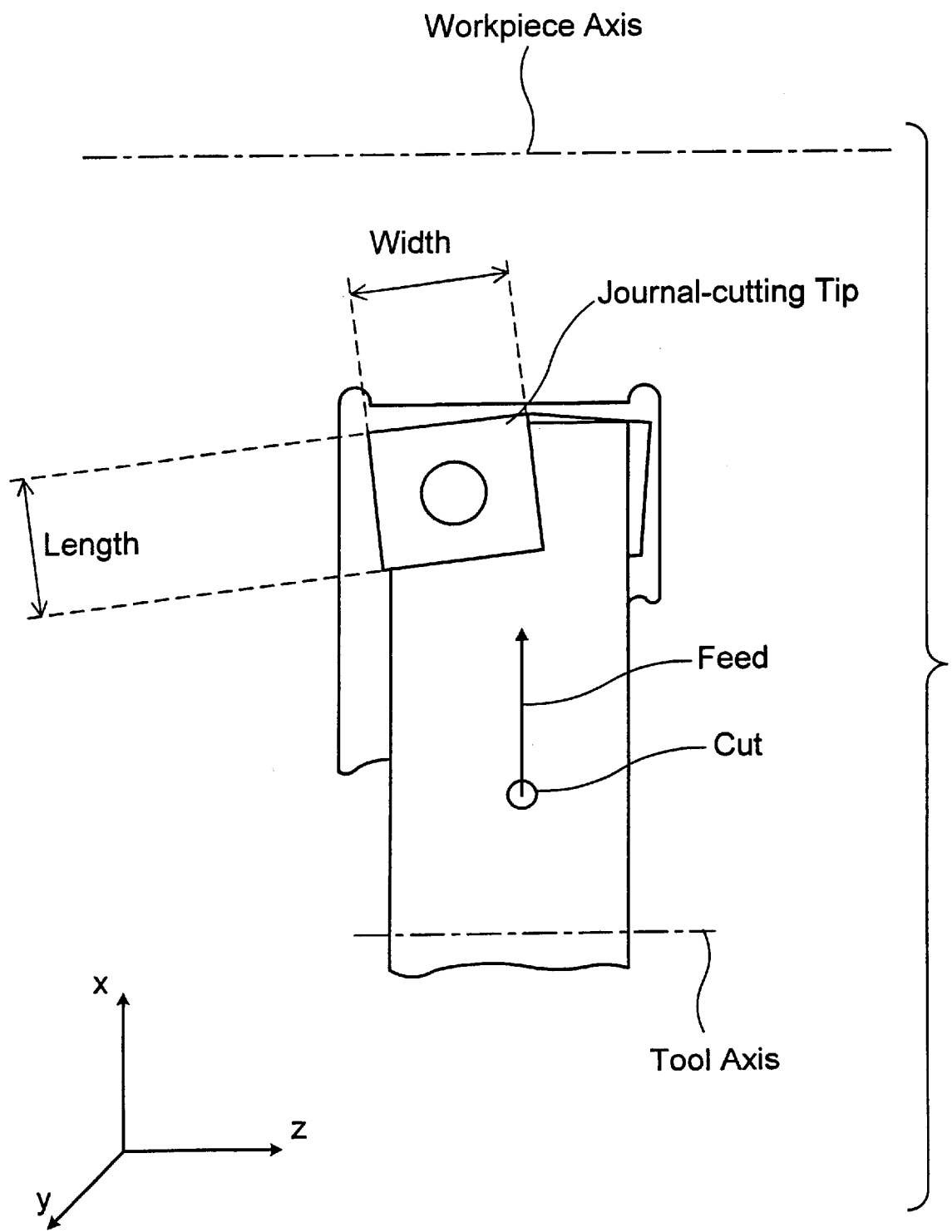
FIG. 13b shows the insert of a journal-cutting tip, in the Y-direction of viewing.

FIG. 13b shows, in the same direction of viewing as FIG. 13a, the machining of the peripheral surface of a journal of the crankshaft by means of a journal-cutting tip. For a tip of this kind, length and width are intended to mean the sides which can be seen in the plan view of FIG. 13b, the square throw-away cutting-tool tips usually being used as journal-cutting tips; these throw-away cutting-tool tips can thus be used four times in succession.

The journal-cutting tips can then be fastened with their external cutting edge at a small angle deviating from the Z-direction within the Z-X plane on the body of the disc milling cutter if, at the same time, a deviation from the Z-direction is also provided within the Z-Y plane.

Key to Figures

Figure 11:
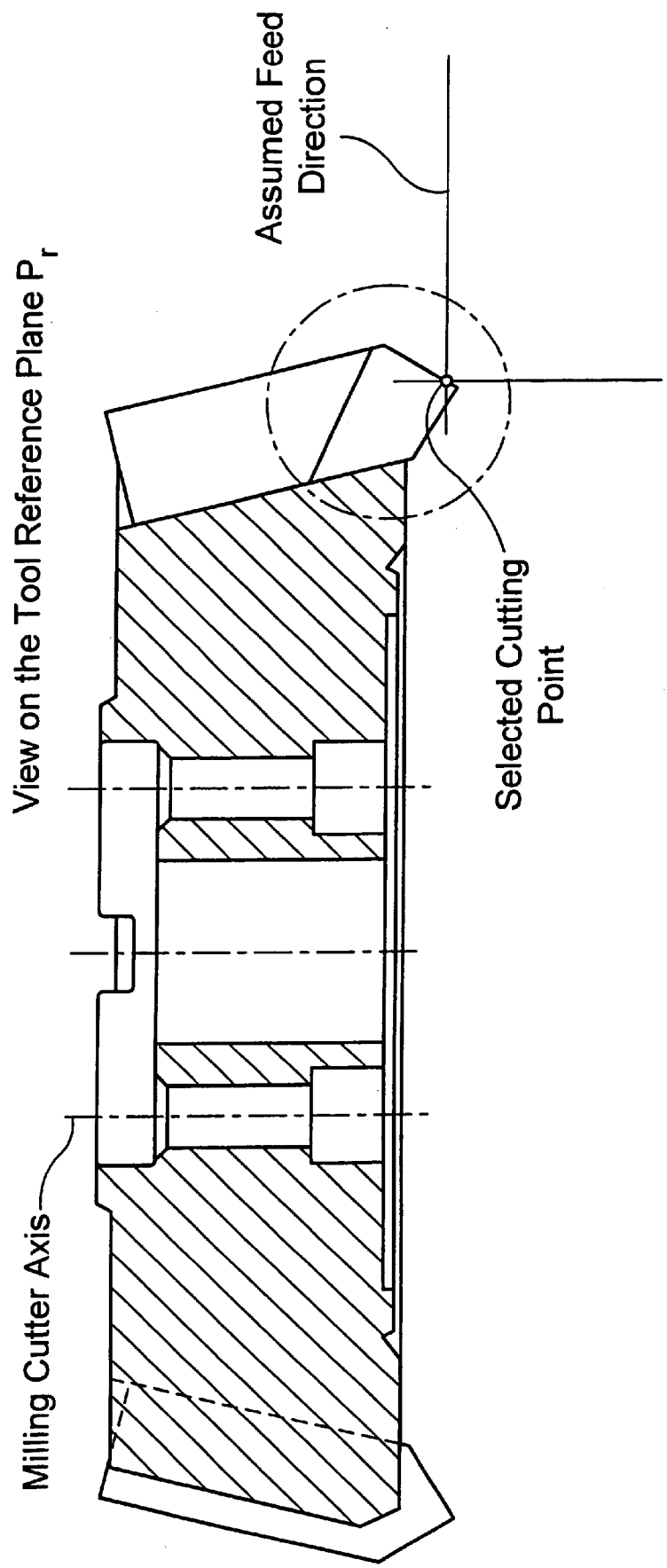
FIG. 11 shows a section through a milling cutter head.
Figure 12A:
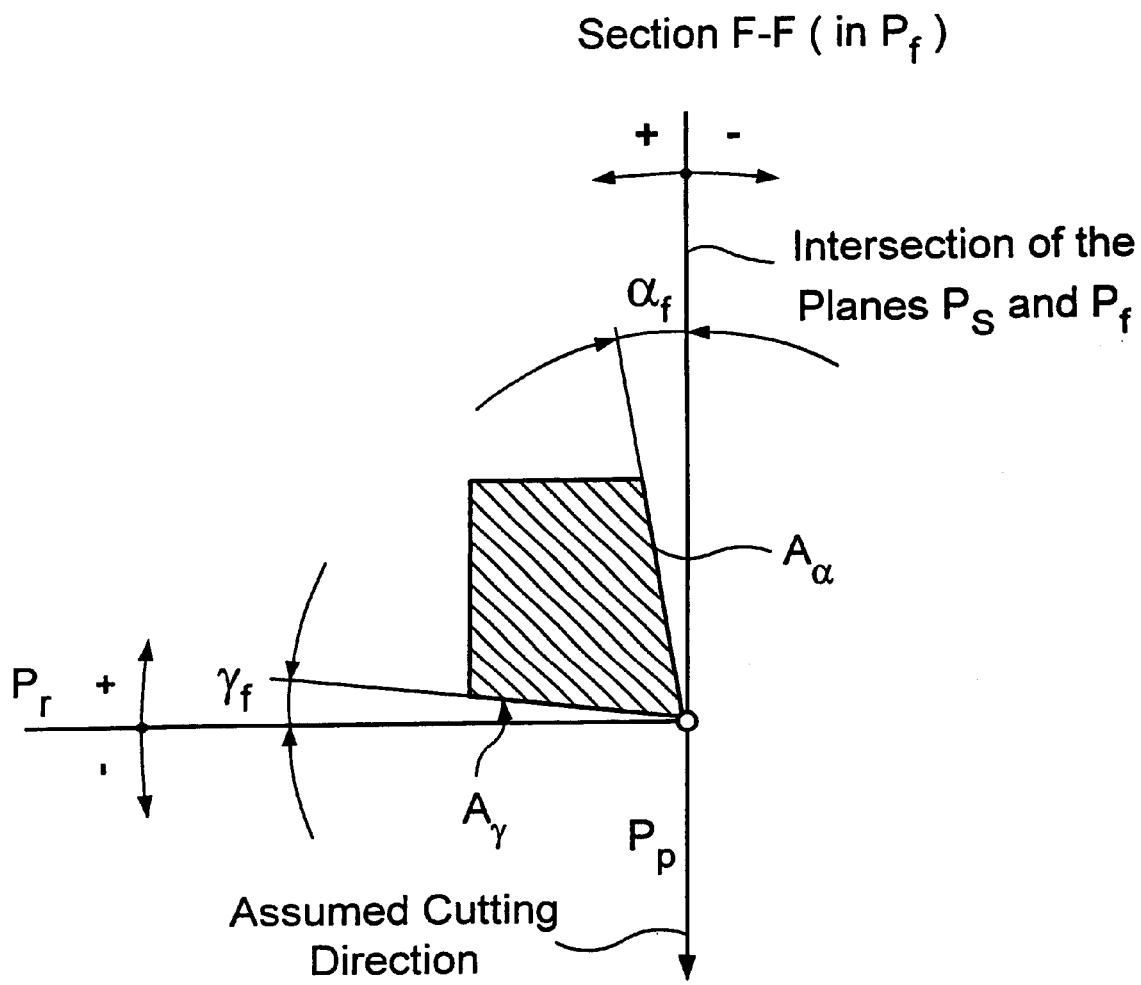
FIGS. 12a–12f show sections through the tool of the milling cutter head in accordance with FIG. 11.
Figure 12B:
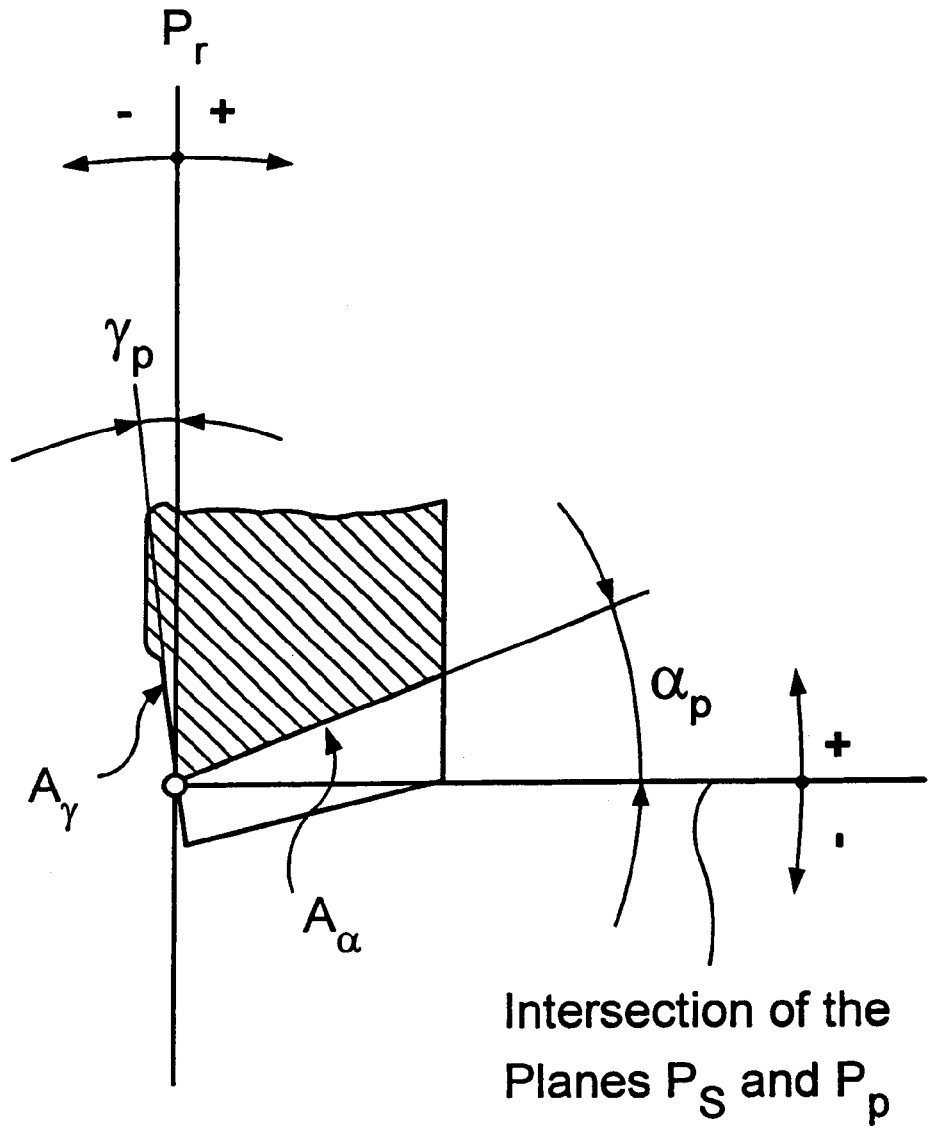
Figure 12C:
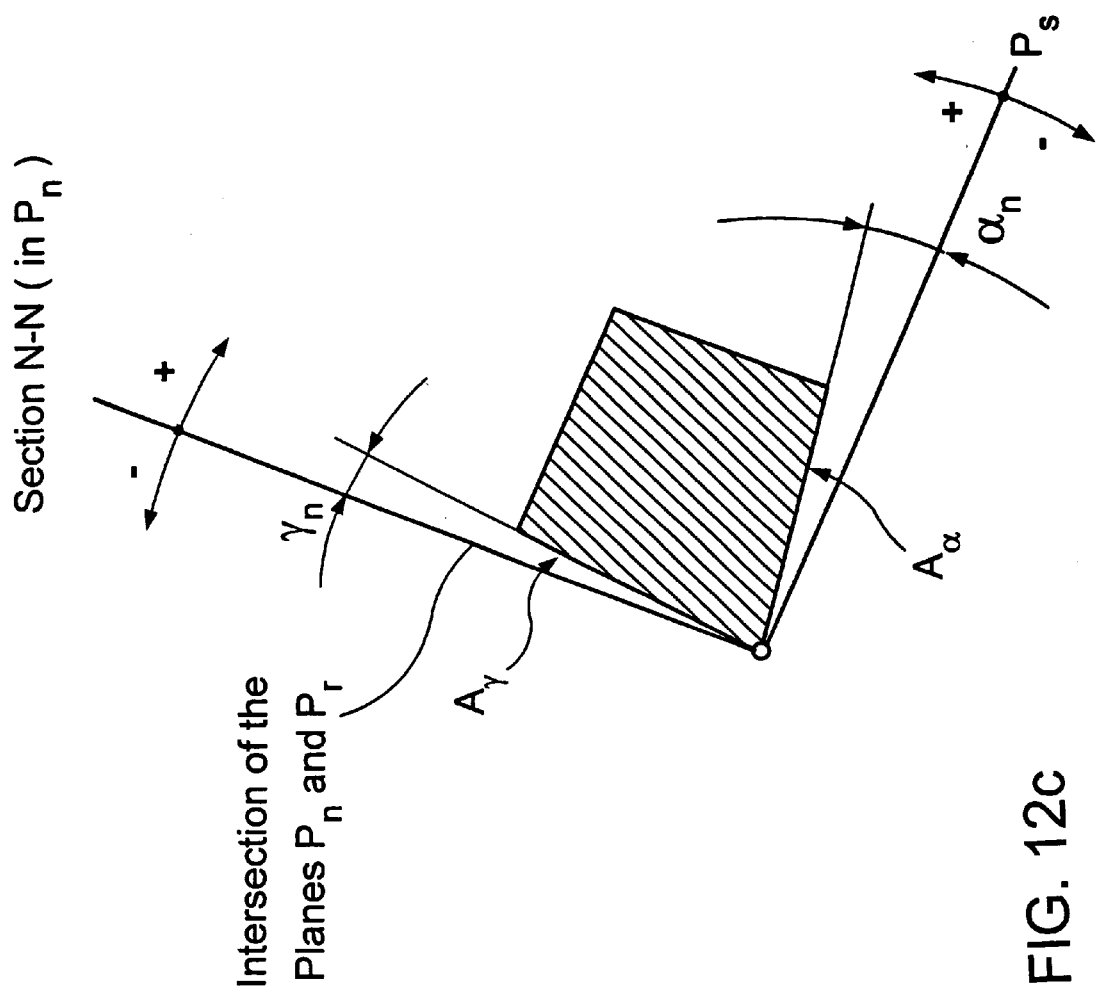
Figure 12D:
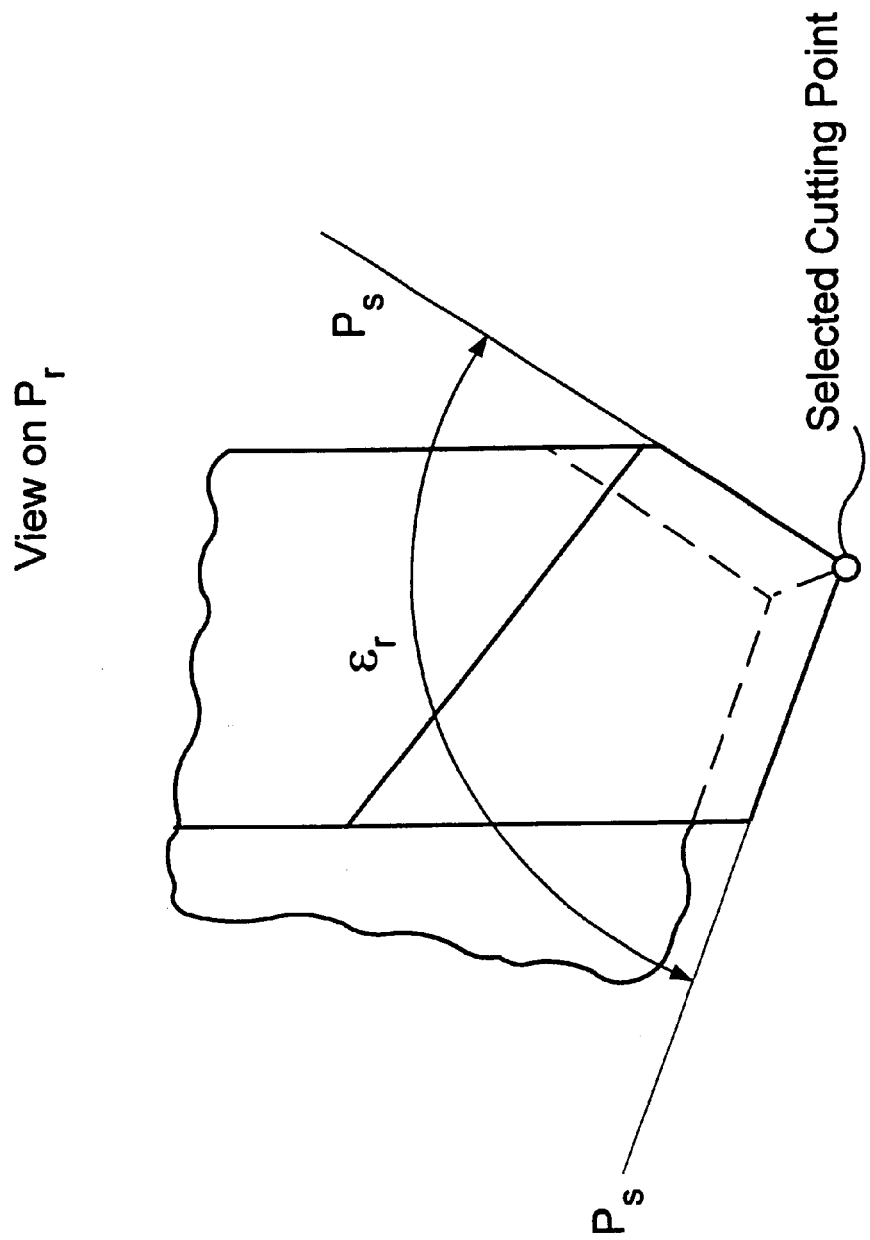
Figure 12E:
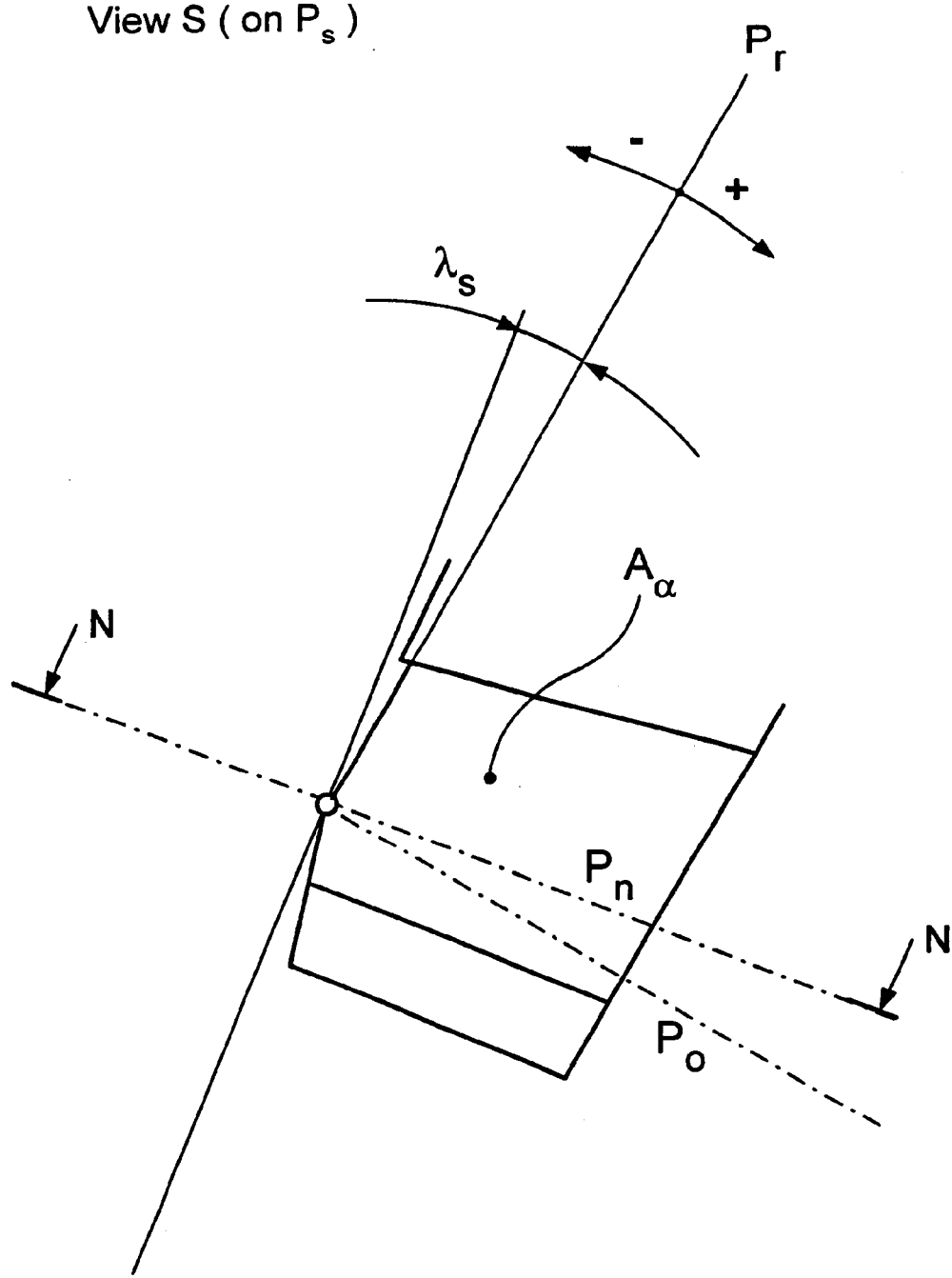
Figure 12F:
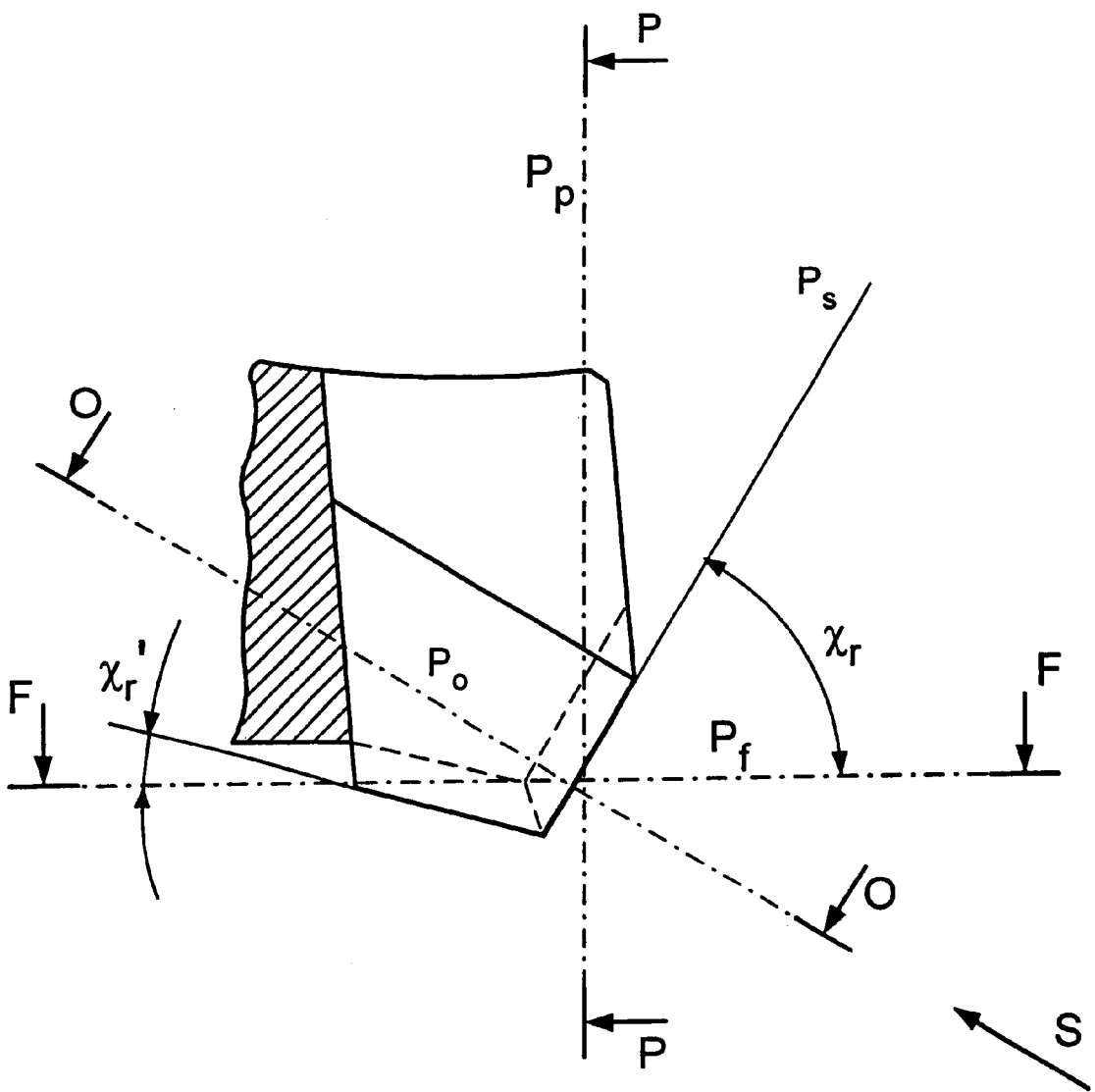

FIG. 1:
1. Base dimension
2. Final dimension
3. Cutting path
4. Detail
5. Workpiece
6. Tool body FIG. 2:
1. Feed FIG. 4:
1. Cutting edge
2. Feed FIG. 5:
1. Roundness correction
2. Traverse-in angle
3. Correction points FIG. 6:
1. Cutting direction
2. Cutting edge S
3. Tool face $A_\gamma$
4. Feed direction
5. Wedge
6. Plane of figure=working plane
7. Main flank $A_\alpha$ FIG. 7:
1. Assumed cutting direction
2. Assumed feed direction
3. Selected cutting point
4. Support plane FIG. 8:
1. Assumed cutting direction
2. Assumed feed direction
3. Selected cutting point
4. Support plane FIG. 9:
1. View R (on $P_r$)
2. Assumed feed direction
3. Selected cutting point
4. Section F—F FIG. 10:
1. Assumed feed direction
2. View R (on $P_r$)
3. Section P—P FIG. 11:
1. Milling cutter axis
2. View on the tool reference plane $P_r$
3. Assumed feed direction
4. Selected cutting point FIG. 12a:
1. Section F—F (in $P_f$)
2. Intersection of the planes $P_s$ and $P_f$
3. Assumed cutting direction FIG. 12b:
1. Section P—P (in $P_p$)
2. Intersection of the planes $P_s$ and $P_p$ FIG. 12c:
1. Section N—N (in $P_n$)
2. Intersection of the planes $P_n$ and $P_f$ FIG. 12d:
1. View on the tool reference plane $P_r$ with the selected cutting point at the tool nose
2. Selected cutting point FIG. 12e:
1. View S (on $P_s$)

FIG. 13b:
1. Workpiece axis
2. Web
3. Web-cutting tip
4. Feed
5. Thickness
6. Length
7. Cut
8. Tool axis FIG. 13a:
1. Workpiece axis
2. Width
3. Journal-cutting tip
4. Length
5. Feed
6. Cut
7. Tool axis

What is claimed is:

1. Process for the metal-removing machining of surfaces on a workpiece (WST) which is chucked on a central axis of the workpiece ($Z_1$-axis) such that the workpiece can rotate (C-axis) in a defined manner, the metal-removing machining being carried out by milling, comprising the steps of:

machining the workpiece (WST) simultaneously on at least first and second machining surfaces, a form and/or rotational position of which, with respect to the central axis ($Z_1$), do not coincide, at least one of said machining surfaces being eccentric with respect to the central axis of the workpiece, and machining each at least first and second machining surface by separate, at least first and second milling cutters (WZ1, WZ2, ...), each of which can only move in a movement path which is transverse to the workpiece (WST), and each of which operates independently and separately from the other, controlling the rotational parameters of the workpiece (WST) with regard to rotational position, rotational speed ($n_{wst}$) and direction of rotation taking into account movement parameters, the movement parameters being transverse movements and rotational speeds of each of the at least first and second milling cutters (WZ1, WZ2, ...) at a particular point in time, and controlling transverse movement and rotational speed (n1, n2, . . .) of each of the at least first and second milling cutters (WZ1, WZ2), separately and independently of each other, on the basis of the rotation of the workpiece (WST).

2. Process according to claim 1, wherein the movement path of the milling cutters (WZ1, WZ2) is a linear movement path along an X-axis, wherein the rotation of the workpiece is about a Z-axis.

3. Process according to claim 1, wherein the movement path of the milling cutters (WZ1, WZ2), transversely with respect to the central axis of the workpiece, is a curved pivoting movement about a Z-axis, the Z-axis being an axis of rotation of the workpiece.

4. Process according to claim 1, wherein the transverse movement and rotational speed (n1, n2) of the milling cutters (WZ1, WZ2) is controlled on the basis of a rotation of the workpiece.

5. Process according to claim 1, wherein the transverse movement and rotational speed (n1, n2) of the milling cutters (WZ1, WZ2) is controlled on the basis of a rotational position and a rotational speed of the workpiece at a particular point in time.

6. Process according to claim 1, further comprising the steps of calculating in advance for a milling operation, the rotation of the workpiece and also the transverse movement and rotation of each milling cutter (WZ1, WZ2), to thereby provide a machining program, and carrying out the machining in accordance with the machining program.

7. Process according to claim 1, wherein the rotational parameters of the workpiece and the movement parameters of the milling cutters are optimized for obtaining a maximum average chip thickness ($h_{mitt}$).

8. Process according to claim 1, wherein the rotational parameters of the workpiece and the movement parameters of the milling cutters are optimized for obtaining maximum chip thickness ($h_{max}$).

9. Process according to claim 1, wherein the rotational parameters of the workpiece and the movement parameters of the milling cutters are optimized for maximizing cutting speeds ($v_{s1}$ or $v_{s2}$).

10. Process according to claim 1, wherein the rotational parameters of the workpiece and the movement parameters of the milling cutters are optimized for achieving a precise average chip thickness ($h_{mitt\ 0}$) on all the milling cutters (WZ1, WZ2).

11. Process according to claim 1, wherein the rotational parameters of the workpiece and the movement parameters of the milling cutters are optimized for achieving a precise average chip thickness ($h_{mitt\ 0}$) on all the milling cutters as a primary optimization target, and as high a cutting speed as possible at each of the milling cutters (WZ1, WZ2) is attained as a secondary optimization target.

12. Process according to claim 1, wherein the milling involves milling by means of an external-milling cutter.

13. Process according to claim 1, wherein the milling involves high-speed milling at cutting speeds of 350–500 m/min.

14. Process according to claim 1, wherein the milling cutter has a positive tool geometry.

15. Process according to claim 1, wherein the milling involves milling on an already hardened workpiece.

16. Process according to claim 1, wherein, during milling of a bearing journal, the milling cutter is fed in over the course of a traverse-in phase of 20°–100° relative to a rotation of the bearing journal to be machined.

* * * * *